(12) United States Patent
Santucci et al.

(10) Patent No.: US 8,042,736 B2
(45) Date of Patent: Oct. 25, 2011

(54) TRACKING AND PROPERTIES CONTROL SYSTEM FOR BULK MATERIALS

(75) Inventors: Michael Santucci, Akron, OH (US);
James Scavuzzo, Medina, OH (US);
Nilimb Misal, Cuyahoga Falls, OH (US); Martin Z. Bazant, Lexington, MA (US)

(73) Assignee: Engineering Consultants Group, Inc., Akron, OH (US)

(*) Notice: Subject to any disclaimer, the term of this patent is extended or adjusted under 35 U.S.C. 154(b) by 0 days.

(21) Appl. No.: 12/428,683

(22) Filed: Apr. 23, 2009

(65) Prior Publication Data
US 2009/0266891 A1 Oct. 29, 2009

Related U.S. Application Data

(60) Provisional application No. 61/125,262, filed on Apr. 23, 2008.

(51) Int. Cl.
*G06K 5/00* (2006.01)
(52) U.S. Cl. .................................. 235/380; 235/385
(58) Field of Classification Search .................. 235/375, 235/385, 380
See application file for complete search history.

(56) References Cited

U.S. PATENT DOCUMENTS

| | | | | |
|---|---|---|---|---|
| 4,512,705 A * | 4/1985 | Gutsch | ......................... | 414/327 |
| 4,562,044 A | 12/1985 | Bohl | ............................... | 422/64 |
| 4,794,870 A | 1/1989 | Visvesvaraya | ................ | 110/187 |
| 6,796,504 B2 | 9/2004 | Robinson | ................. | 235/462.13 |
| 6,865,245 B2 | 3/2005 | Bazant | .......................... | 376/381 |
| 7,542,873 B2 | 6/2009 | Vince et al. | ................... | 702/182 |
| 7,598,857 B1 * | 10/2009 | Reagan et al. | ........... | 340/539.22 |
| 2001/0029996 A1 * | 10/2001 | Robinson | ......................... | 141/11 |
| 2004/0267395 A1 * | 12/2004 | Discenzo et al. | .............. | 700/99 |
| 2005/0040222 A1 | 2/2005 | Robinson | ...................... | 235/375 |
| 2006/0040546 A1 | 2/2006 | Werthman et al. | ............ | 439/488 |
| 2006/0050835 A1 | 3/2006 | Bazant | .......................... | 376/381 |
| 2008/0300712 A1 * | 12/2008 | Zachmann | .................... | 700/116 |

OTHER PUBLICATIONS

Lauf, Deryck, "RFID Coal Tracking," May-Dec. 2000, Transponder News, http://www.rapidttp.com/transponder/tcoalsrt.html, pp. 1-3.*
*Dynamics of random packings in granular flow;* Rycroft et al; The American Physical Society; Physical Review E73, May 13, 2006.
*The Spot Model for random-packing dynamics;* Bazant; Mechanics of Materials 38 (2006); 717-731; www.sciencedirect.com.
*Blending's Impact on Coal Quality;* Coal Power Magazine; Jul./Aug. 2007 issue; p. 19;www.ecg-inc.com.
*Keep bulk materials moving;* Dr. John W. Carson; www.plantservices.com/articles/2006/089.html.

* cited by examiner

*Primary Examiner* — Daniel Hess
*Assistant Examiner* — Tabitha Chedekel
(74) *Attorney, Agent, or Firm* — Renner Kenner Greive Bobak Taylor & Weber

(57) ABSTRACT

The invention provides a system of devices and a set of methods for accurately characterizing, tracking and controlling bulk material flows. Measurements of input material properties, dynamical measurements involving identifiable tags, and fast, discrete simulations are combined to predict and control the composition of bulk material exiting a container, such as a silo, bunker or hopper. In one embodiment, a system is provided for a coal-fired power plant where the properties of coal are assessed, then the coal is marked and tracked to provide the plant's operators improved control over the coal mixture and target bulk properties as it makes its way from a coal receiving station to delivery for combustion in a furnace.

19 Claims, 18 Drawing Sheets

| Projected Fuel Properties (to Boiler) ||||||
| --- | --- | --- | --- | --- | --- |
| | Boiler Capability % | SO2 | NOX | $/MMBTU | Slag Index |
| Boiler 1 | | | | | |
| Current | 94 | 2.1 | 0.7 | 1.55 | 6.2 |
| 1-Hr Ahead | 96 | 2.2 | 0.7 | 1.57 | 5.2 |
| 2-Hr Ahead | 96 | 2.2 | 0.7 | 1.57 | 5.7 |
| 4-Hr Ahead | 96 | 2.3 | 0.8 | 1.58 | 5.2 |
| 8-Hr Ahead | 98 | 2.3 | 0.7 | 1.60 | 4.9 |
| Boiler 2 | | | | | |
| Current | 95 | 2.1 | 0.7 | 1.56 | 5.3 |
| 1-Hr Ahead | 95 | 2.3 | 0.8 | 1.57 | 5.3 |
| 2-Hr Ahead | 97 | 2.3 | 0.7 | 1.58 | 5.1 |
| 4-Hr Ahead | 97 | 2.2 | 0.8 | 1.58 | 5.2 |
| 8-Hr Ahead | 94 | 2.4 | 0.8 | 1.53 | 6.4 |

| Receiving Station | 2 |
|---|---|
| Stacker | MIDS |
| Supplier ID | 564 |
| Lot # | 10486 |
| Tonnage (total) | 141123 |

| Analysis | Vendor | As Rcv'd. |
|---|---|---|
| BTU | 11870 | 11320 |
| Sulfur | 1.7 | 1.5 |
| Ash | 6.4 | 7.2 |
| Moisture | 7.4 | 8.1 |
| $/MMBTU | 1.53 | 1.61 |
| RFID Seed Rates: 1/1000 Tons | | |

| Belt Scales | | |
|---|---|---|
| | TPH | % |
| CV-1 | 643 | |
| CV-2A | 0 | 0 |
| CV-2B | 203 | 45 |
| CV-2C | 153 | 38 |
| CV-3 | 382 | |

| Fuel Yard Inventory (As Received) | | | |
|---|---|---|---|
| | PERF ▲ | MIDS × | ECON ○ |
| Tons | 127,400 | 321,208 | 270,500 |
| BTU/LB | 12,158 | 11,132 | 10,942 |
| SO2 Rate | 1.8 | 1.7 | 1.8 |
| Ash | 6.4 | 7.2 | 7.5 |
| Moisture | 7.2 | 8.4 | 8.5 |
| Cost ($/MMBTU) | 1.74 | 1.58 | 1.47 |
| Total Tonnage | 719,108 | | |

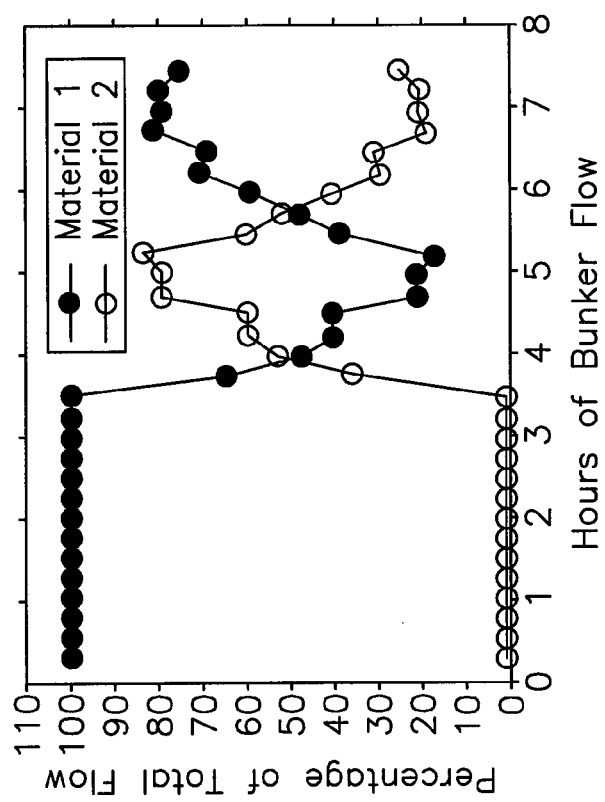
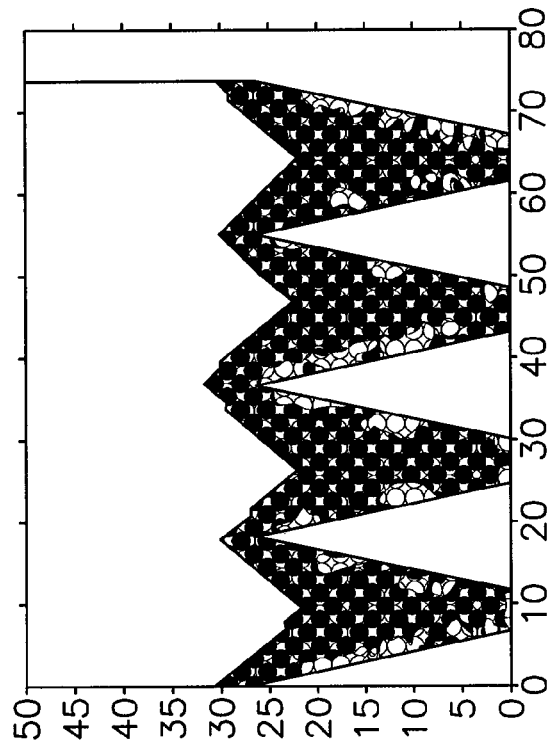
FIG-5C

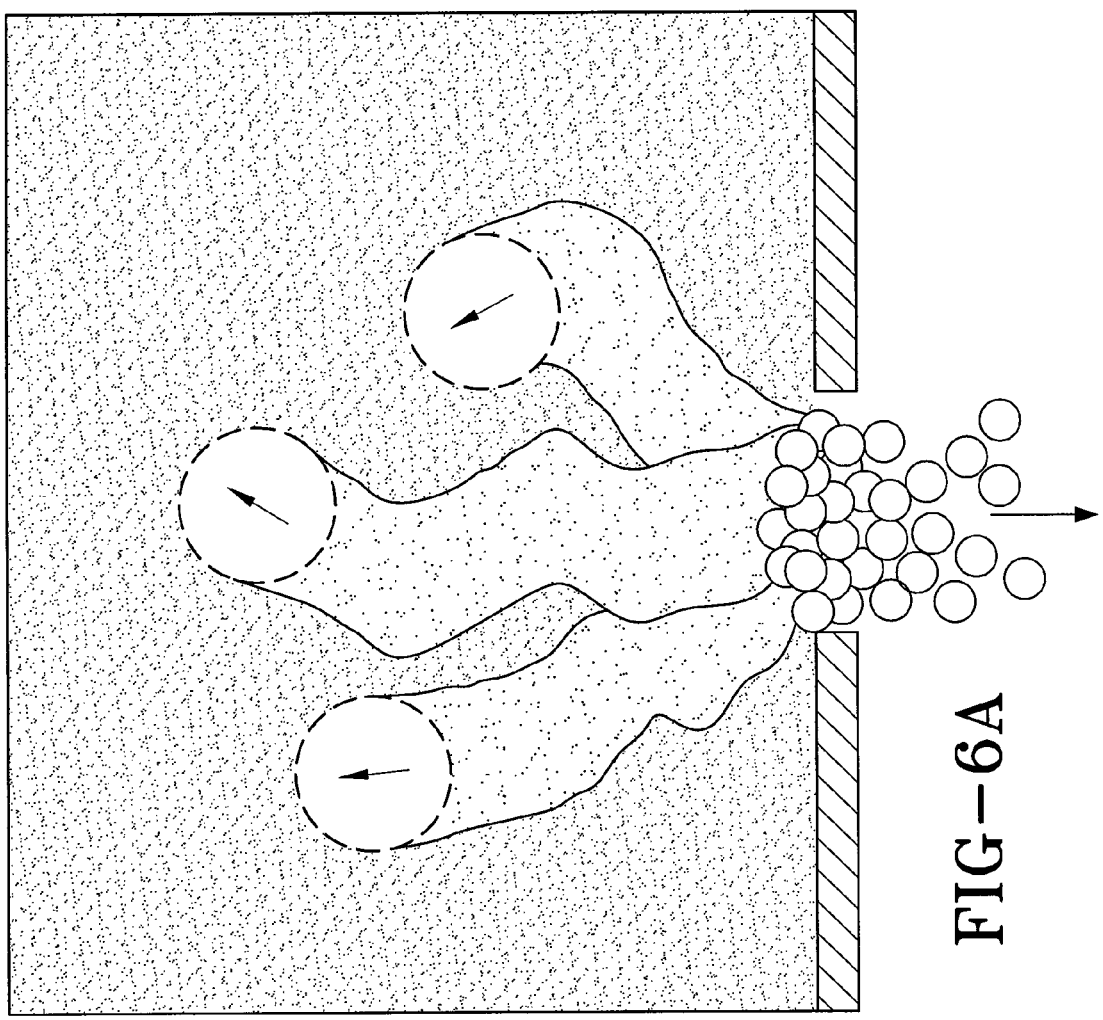

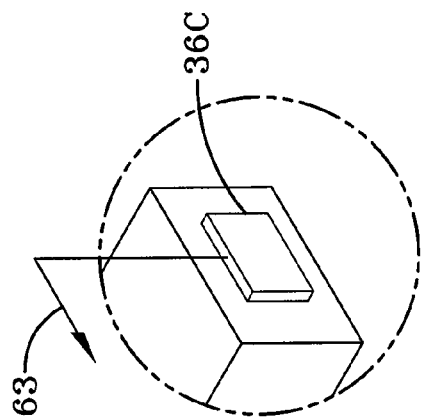
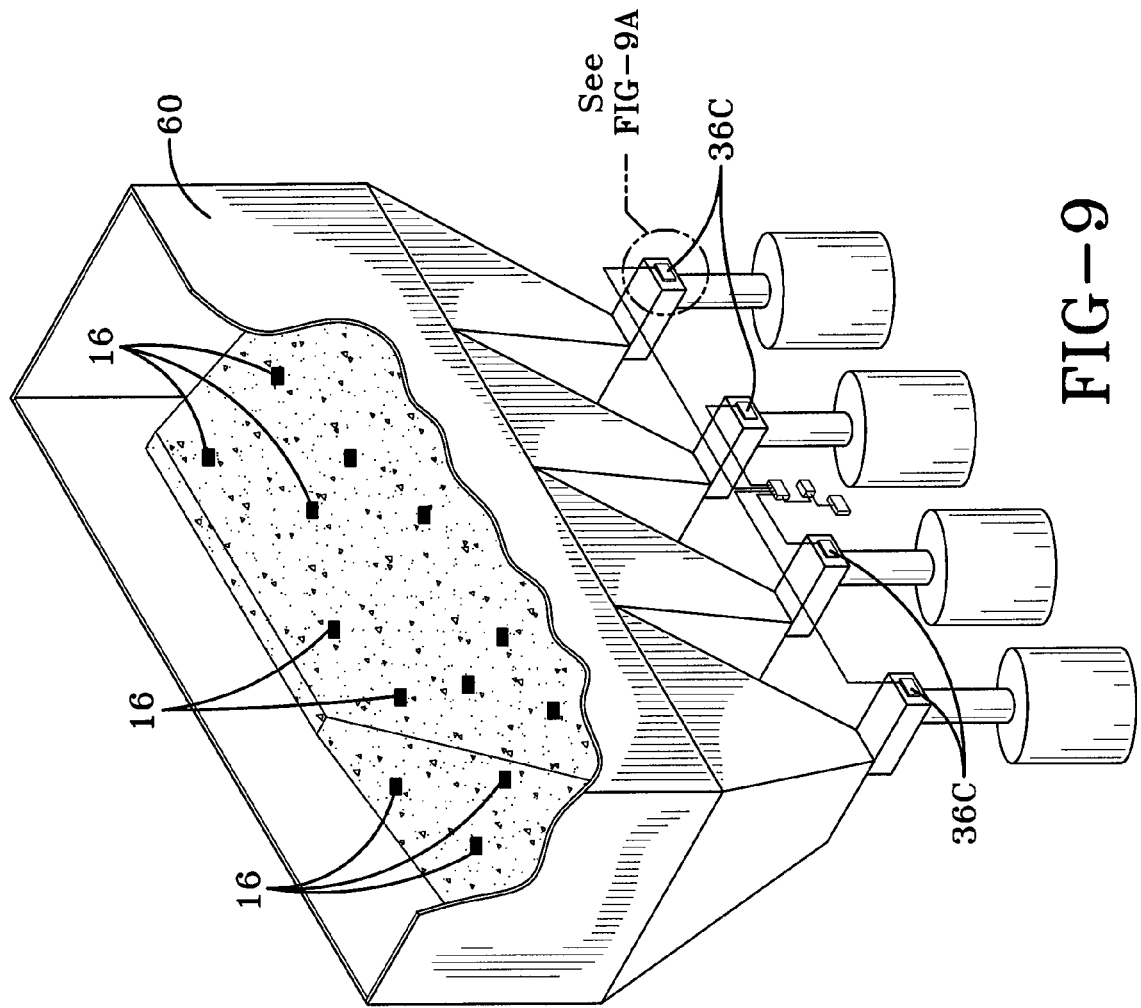
FIG-9A
FIG-9

TRACKING AND PROPERTIES CONTROL SYSTEM FOR BULK MATERIALS

CROSS-REFERENCE TO RELATED APPLICATIONS

This application claims priority of U.S. Provisional Application Ser. No. 61/125,262 filed Apr. 23, 2008, which is incorporated herein by reference.

TECHNICAL FIELD

The present invention is related to the handling of bulk materials, specifically the characterization, tracking, and controlling bulk flows to and from storage containers, such as silos, bunkers, and hoppers. In certain embodiments, the invention relates to bulk material handling at solid-fueled/coal-fired power plants, cement plants, asphalt/aggregate plants, ethanol plants, recycling facilities, pebble-bed nuclear reactors and materials production or processing plants.

BACKGROUND

In the past, the characterization of bulk flowable materials was made based on past experience and supplier information, which was often unsubstantiated and outdated. Significant distinctions, involving traits often not readily discernible, were accepted as unavoidable—despite deleterious effects—due to the inability to characterize or control either the properties or materials. Today, however, handlers of bulk flowable materials are increasingly being called upon to make fine distinctions related to the bulk characteristics of the materials for economic and process/product control implications. Consequently, there exists a need to provide ready identification of a material's traits to those responsible for storing, transporting, processing or otherwise handling the material.

This need is quite general and arises in many different industries. For example, the treatment traditionally given solid fuels, such as coal, illustrates the types of practices previously applicable to bulk flowable materials in general. Plant-site segregation of different fuels was often given minimal attention in storage and handling. Coal-yard efforts of separation were largely limited to delivery mode or general fuel type, such as truck/train/barge and bituminous/sub-bituminous coal respectively. However, the inherent quality and cost differences of the available fuels require the competitive power plant to identify the coal by quality and segregate it for its optimal operational and economic use.

Fuel analyzers have been developed to identify the constituents of coal, such as carbon, nitrogen, sulfur, minerals and moisture. From this analysis, other properties can be determined including the heat value (the heat value measure of energy is often expressed in BTUs, short for British Thermal Units) and slagging characteristics. Higher quality coals typically have greater BTU and lower ash content than lesser coals. The delivered cost of different grades of coal is generally related to the coal's energy value, sulfur content (which is important for environmental/regulatory reasons), transportation and availability. Though often limited by original boiler design considerations, coal-burning power plants can tolerate coal with a range of properties, from higher-grade and usually more expensive performance coals to lesser grade and problematic but often less expensive coals. These less expensive fuels typically offer greater energy-per—cost economics. Thus, there is a need to enable coal-burning power plants to tailor time-dependent fuel use within boiler design constraints to meet varying electric output demands and economic constraints.

When coal arrives at a power plant, it is unloaded from the transport vessels, weighed, analyzed (if so equipped), and stored in large coal piles. A typical storage area might include a 30 to 60 day supply of coal weighing more than one million tons and spanning many acres. Coal with distinctive properties is often placed in segregated, predesignated areas for storage and eventual selective reclaim according to a variety of resource optimization criteria. These criteria can include combustion characteristics, heat content and economic value. Practical considerations of handling and characterization normally limit segregation of fuel to two to four types depending on site specific circumstances and plant layout. Due to the macroscopic size of the coal piles and the large equipment used to handle the fuel, distinctions between lots of similar coal having varying properties are not achievable in most storage areas. Thus, there is a need for plant operators to more accurately identify and label the coal and its inherent properties as it is received in, stored, and reclaimed from the coal yard.

Coal is usually retrieved from the storage area by large earth-moving equipment, and is directed toward the power plant through hoppers, conveyor belts, and other delivery systems. The coal retrieved from the storage area is selectively reclaimed and, if capabilities exist, might be blended, with the aim of delivering to the furnace a fuel that is projected as optimal. In other words, it is desired to use coal of a selected quality that provides a projected output with a minimal cost and acceptable operational implications. After the coal is retrieved from the storage area and blended, it is typically transferred to a short-term storage silo. As the coal flows by gravity through the silo, however, its flow patterns are complex. Although it is normally assumed that bulk material flows through a silo according to a plug-flow model, following "first in, first out" (FIFO) characteristics, this simplified assumption is far from accurate. Several variables that significantly impact coal flow in the silo include the coal particle size, surface moisture of the fuel, the top surface profile, the geometry of the silo, and fill projections of the silo.

Several flow theories have been developed that can fairly accurately describe the silo flow phenomenon for simple model situations, such as visco-elastic frictional spheres. However, multi-processor computers take hours to days to calculate flow predictions using these theories. Flow characteristics of more complicated bulk material situations have proven even more difficult to calculate, especially at the individual particle level and in three dimensions. Another drawback to these theories and modeling approaches is the difficulty of adjusting material and flow parameters in real time to accurately reflect actual conditions. Thus, there is a need to more quickly predict in real time the flow of coal mixtures through the silos of the power plant.

Time-dependent generational forecasts are often developed to project the economics of future power generation. A generation load forecast typically takes into account such factors as projected consumer demand, weather, time of day, loads, sales to other utilities (off-system sales), market prices and equipment capabilities. Thus, the load forecast may be useful for predicting what near-term generational requirements will be. To improve the accuracy of these generation forecasts, there exists a need for improved methods of characterizing, tracking, and controlling the projected optimal fuel to be burned at a power plant based on fuel availability, fuel costs and existing bunkered fuel supplies.

It should be clear that similar needs arise in many other situations. For example, organic materials, such as wood chips, corn, or grasses are transported to biofuel processing plants and are stored in bunkers and silos during the various stages of ethanol production. There is a need to better characterize and control the raw material mixtures in these processing plants. Also, recycling plants encounter similar needs in handling heterogenous mixtures of raw materials, such as plastics, glasses, papers, and metals. Similar needs are also encountered in materials processing in chemical, metallurgical, construction, aggregate, and pharmaceutical industries, where large quantities of component materials are handled, stored, and precisely blended in various stages of production.

In all of these applications, time dependent flows in silos are very difficult to accurately characterize and reliably predict, especially for complex bulk materials and in such a way that can be implemented efficiently in real time during material handling. Most flow models cannot predict the complex bulk material flows with sufficient speed, flexibility, and accuracy, yet provide an ease of implementation. For example, continuum flow models based on theories such as limit-state plasticity, elastoplasticity, or kinematic assumptions, are not capable of handling arbitrary geometries and complex, poorly characterized materials. Moreover, numerical implementations of continuum mechanic models (e.g. by finite elements) can be prohibitively slow for real-time analysis and are closely tied to particular geometries, to which the mesh is adapted. Continuum models also make no attempt to describe stochastic fluctuations in discrete materials, which lead to mixing. And, fully discrete simulation methods attempting to describe all particle contacts also have prohibitive limitations, related to microscopic assumptions and computational cost. For example, brute-force simulation of discrete particles by the Discrete Element Method is limited to the case of visco-elastic spheres, which grossly oversimplifies most bulk materials and cannot easily be extended, e.g. to model irregular particle shapes or polydisperse packings. More significantly, the method is extremely computationally intensive. Three-dimensional sphere simulations have only become possible in the past decade and virtually always require a parallel supercomputer to run for days to simulate the drainage of reasonable numbers of particles. For these reasons, the methods are currently not suitable for real-time simulation and tracking of bulk materials.

Another obstacle for each of these prior approaches is the difficulty of adjusting the parameters in real time to accurately reproduce observed flow conditions, which might depart from an initial version of the model with parameters fitted or assumed under different conditions. Thus, there is a general need for a timely method to accurately describe a wide range of complex flows of bulk materials.

SUMMARY OF THE INVENTION

In light of the foregoing, it is a first aspect of the present invention to provide methods to implement an accurate real-time tracking system for bulk materials.

It is another aspect of the present invention to provide an accurate real-time tracking system for bulk materials, comprising at least one refillable container drained by gravity, a recording system for physical properties of the bulk material as it is added to the container, software to implement a fast discrete simulation algorithm to predict flow and mixing of the material in real time, identifiable tags whose observable dynamics are used to calibrate the simulation, and feedback to control the filling protocol to optimize the projected output material or process.

In one embodiment described in detail, the present invention provides a fuel tracking and control system for a coal-fired power plant. In another aspect of this embodiment, the present invention provides a method for tracking coal in a coal-fired power plant using radio frequency identification markers, comprising receiving coal at a delivery station, designating physical properties of delivered coal as as-received material data, writing to identifiable tags the as-received material data and sending the as-received material data tag information to a controller, distributing the identifiable tags within the coal, segregating the coal into designated sections according to the as-received data, blending the coal from at least one of the sections at a blending station, indicating revised physical properties of the blended fuel as revised material data, updating the identifiable tags in the blended fuel with the revised fuel data, sending updated tag information and revised material data to the controller, delivering the blended fuel to a furnace to generate a predicted, time-dependent power output, and generating signals by the controller to precisely characterize the instantaneous and projected fuel properties to a plant operator.

In other embodiments, the present invention provides tracking systems and methods for bulk materials at aggregate plants, ethanol plants, recycling facilities, pebble-bed nuclear reactors and processing or production plants for chemicals, metals, glasses, ceramics, composites, construction materials, pharmaceuticals, or other materials.

Another aspect of the present invention is to provide a tracking system for bulk materials comprising at least one container that receives a bulk material which is drained from the at least one container by gravity at a container exit, wherein the bulk material has an upper free surface that can be subsequently covered upon receipt of additional bulk material in the at least one container, a plurality of identifiable tags placed in the material at different locations on the free upper surface, a recording system that detects physical properties of the bulk material, wherein the recording system associates the physical properties with at least one the identifiable tag as the bulk material is added to the container, a reader positioned proximal the container exit so as to read the identifiable tags passing therethrough, and a controller connected to the recording system and the reader to monitor and predict the flow of the bulk material through the container.

Still another aspect of the present invention is to provide a method of tracking bulk materials in at least one container drained by gravity, comprising adding bulk material, which has different grades, to a container, seeding the bulk material with identifiable tags, wherein the tags are associated with physical properties of the bulk material's grade, monitoring placement of the identifiable tags in the container and when the identifiable tags exit the container, and adjusting delivery of the bulk material to the container based on the monitored flow of the bulk material therethrough.

Yet another aspect of the present invention is to provide method for tracking coal in a coal-fired power plant using radio frequency identification markers, comprising receiving coal at a receiving station, designating physical properties of received coal as preliminary material data, writing to identifiable tags from the preliminary material data, and sending tag information and the preliminary material data to a controller, distributing the identifiable tags within the coal, segregating the coal into sections according to the preliminary data, blending the coal from at least one of the sections at a blending station, designating revised physical properties of the blended coal as revised material data, updating the identifiable tags in the blended coal with the revised material data, sending updated tag information and revised material data to the controller; delivering the blended coal to a furnace to generate a desired power output, and generating signals by the controller to control blending and delivering to obtain a desired mixture of the coal supplied to the furnace.

BRIEF DESCRIPTION OF THE DRAWINGS

These and other features and advantages of the present invention will become better understood with regard to the following description, appended claims, and accompanying drawings wherein:

FIGS. 5A, 5B and 5C show a simulation result for a tag-calibrated coal bunker to illustrate how shear and mixing during drainage can strongly violate the FIFO assumption, producing mixed and delayed output;

FIGS. 6A, 6B and 6C illustrate the basic concepts behind the fast simulation algorithm used in the control system;

FIGS. 9 and 9A depict a bunker/hopper/feeder/pulverizer apparatus at a coal power plant fitted with devices of the tracking system;

DETAILED DESCRIPTION

The invention provides systems for tracking bulk materials and methods for constructing and using such systems. There are several key features of the invention: the ability to characterize and record properties of discrete volumes of material added to a container, the use of a fast discrete simulation method to predict slow dense flow in the container upon discharge in real time, the calibration and testing of the simulation model by observing the dynamics of identifiable tags, and optional feedback to adjust the filling protocol in response to the simulation to optimize the discharge from the container. These features are general and can each be applied in a number of ways in different settings by those skilled in the art. The teachings herein begin with a detailed description of an embodiment of the invention for coal handling in large bunkers at coal-fired power plants and then proceeds to describe general features of the real-time computer simulation algorithm and its calibration and validation by fitting to the dynamics of identifiable tags. Other embodiments and applications are discussed at the end.

Figure 1:
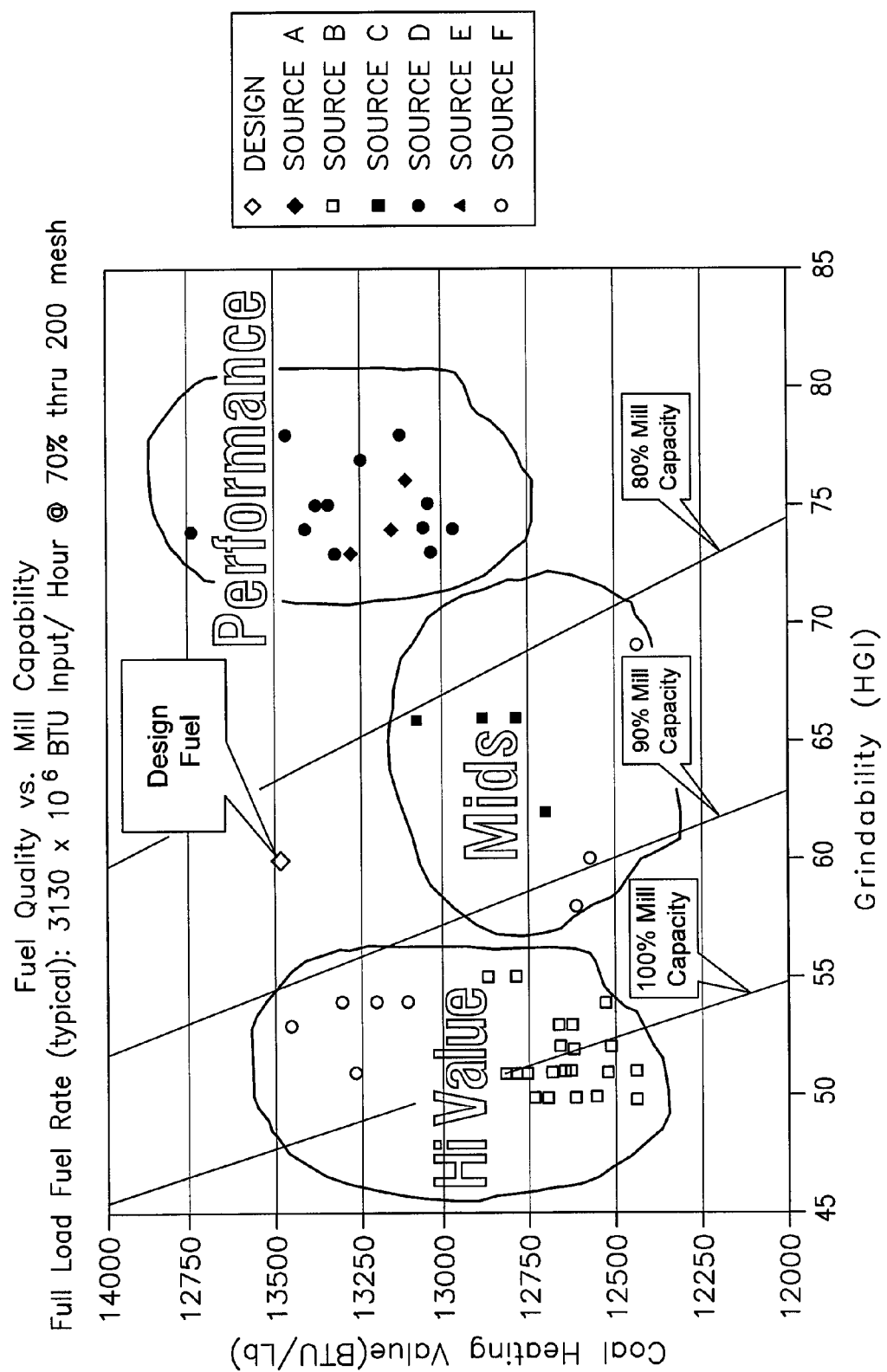
FIG. 1 is a chart depicting the Fuel Quality versus Mill Capability of various types of coal, and an indication of boiler input (and output) capability.

Referring now to the drawings and in particular to FIG. 1, it can be seen that various types of coal are characterized by different hardness and BTU values. Coal that is mined from the Earth has certain inherent properties, including heat value, sulfur, ash, and moisture contents. The economic value of coal is dependent on these properties and others including delivered cost. Fuels referred to as "high value" typically cost less but might be more difficult to grind than "mid" and "performance" grades of coal. The heat value of coal relates to the amount of energy per pound available from the coal. Coal that has lower moisture content and lower ash typically has a higher heat value, therefore giving it greater performance capability. The value of coal is also influenced by other characteristics including sulfur, ash content, operational contingencies (e.g., slagging, fouling) and—most importantly—cost. As seen in FIG. 1, coals designated as "Hi Value" coals typically cost less and, in this instance, are comparatively harder than "Mids" and "performance" fuels. Performance fuels have the highest heat value and are a more expensive type of coal burned in a power plant. The fuels may come from various sources A-F as designated in FIG. 1. A "Design Fuel" is the fuel quality used as the basis for the boiler and ancillary equipment design. Skilled artisans will also appreciate that the mill capacity is related to the coal grindability and performance capability. Environmental considerations, economics, slagging effects and flow characteristics can also determine when and how the type of coal might be used.

Figure 2:
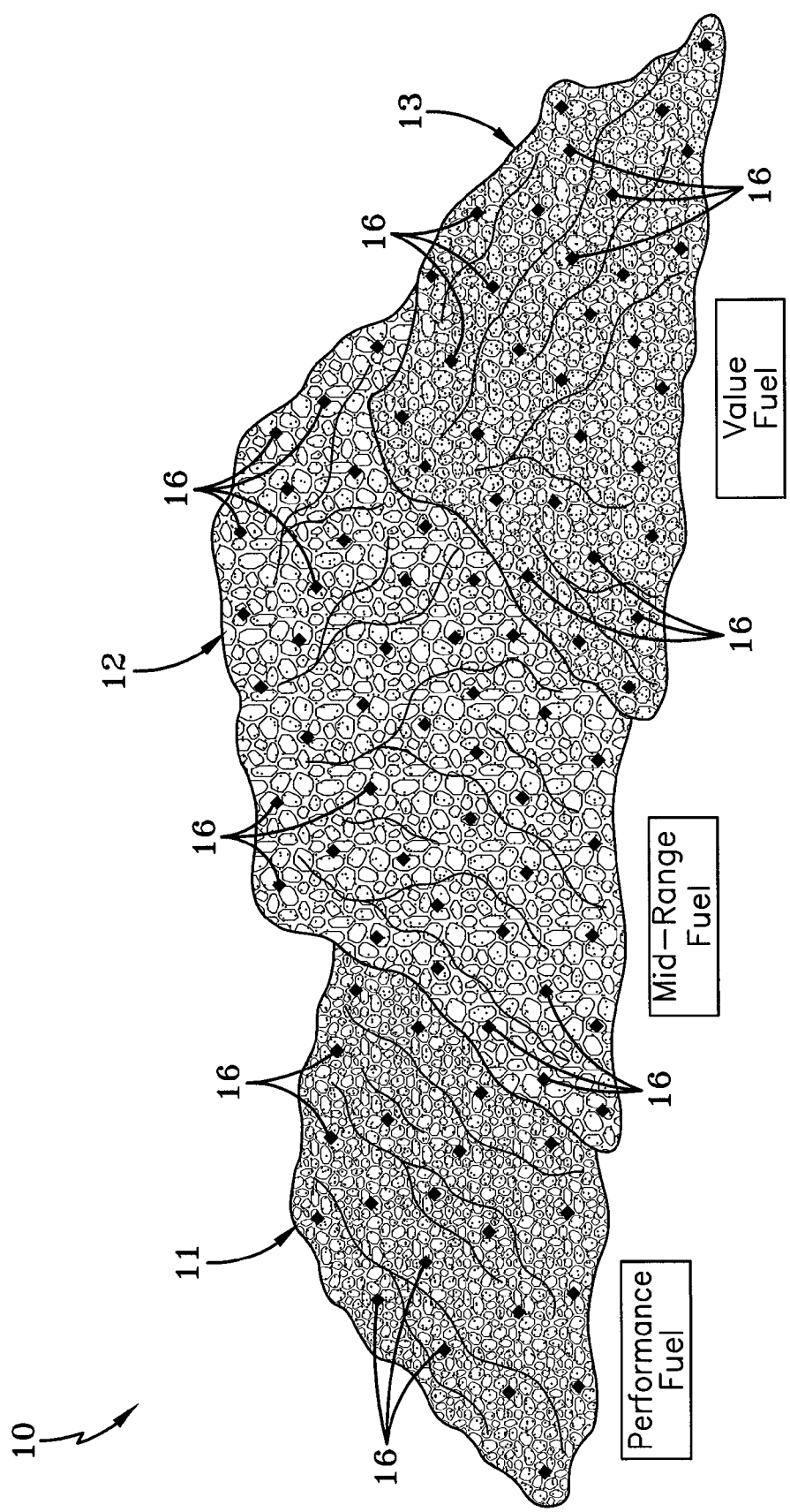
FIG. 2 is a schematic representation of an exemplary coal storage area, including distinct piles of coal separated according to resource characterization criteria, wherein each section has RFID tags associated therewith and each RFID tag is seeded and recorded with historical receipt and analysis specifics.

Referring now to FIG. 2, it can be seen that the coal storage area at a coal-fired power plant covers a large storage area 10 and is comprised of distinct piles of coal that have been separated according to resource characterization grouping. Coal lots having certain properties are directed to sections of the storage area with coal most closely representative of those properties. In other words, one section 11 of the storage area 10 is where "performance" fuels are stored, another section 12 is where "mid-range" fuels are stored, and another section 13 is where economic "high value" fuels are stored. Though not necessarily typical, the high value fuels in FIG. 2 may take up the majority of the storage area 10, with the mid-range and performance fuels taking up the remainder of the storage area 10. Although FIG. 2 shows the storage area 10 having three types of coal, one of skill in the art will appreciate that the storage area may contain other types of coal, and may include smaller or larger sections dedicated to a distinct coal classification.

Radio frequency identification (RFID) tags 16 are shown, randomly distributed throughout so that RFID tags 16 may be found at the surface, just below the surface, and throughout the interior of the piles. In most embodiments, the tags 16 are seeded and logged with a specific parcel of the coal as it is off-loaded from a shipping container such as a barge, rail car or truck. According to the concepts of the present invention and as it relates to a coal-fired power plant, passive RFID tags are used; however, other types of RFID tags could be used in a different context. Passive RFID tags do not require an internal power source to operate. Instead, the passive RFID tags operate by backscattering a carrier wave transmitted by an RFID card reader. Thus, an RFID card reader transmits a carrier wave as a query, and the RFID tag 16 uses the energy of the carrier wave to transmit a response, which the RFID card reader receives and evaluates. According to the concepts of the present invention, each RFID tag 16 has its own unique identification number, and the RFID tag response will include this unique identification number. The RFID tags 16 are selected to have such size and character so as to be compatible with comparable coal particles at the same location so that they will follow a similar flow path as the coal. An associated computer system, or controller, maintains a record of all RFID tags and any information associated with individual RFID tags. While the present embodiment incorporates RFID tags, one of skill in the art would realize that alternative technologies capable of performing the same function could be used. For example, bar code, chemical, color or other types of identification markers could be used.

Figure 3:
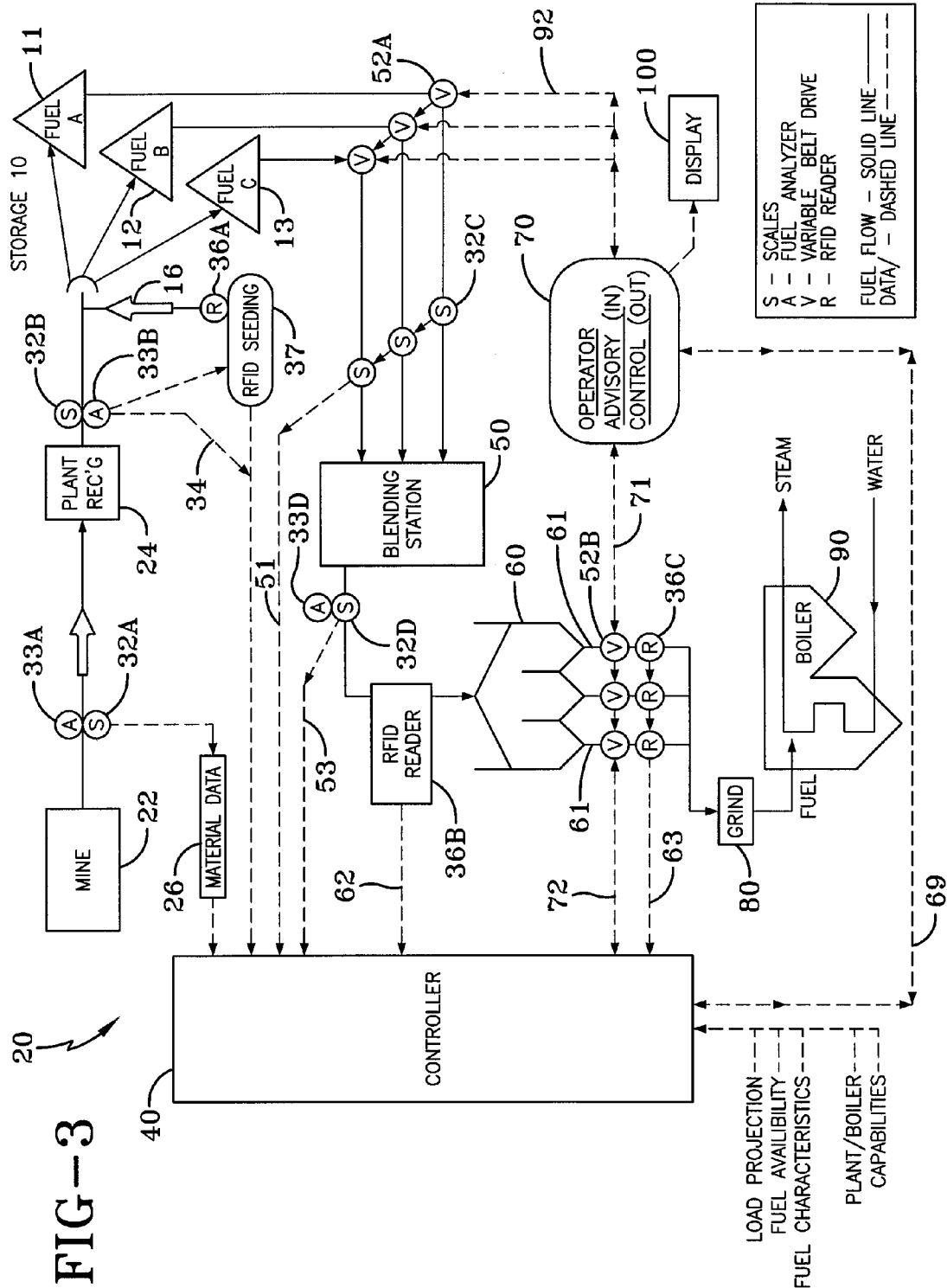
FIG. 3 is a schematic diagram of an exemplary coal tracking system for a coal-fired power plant employing the elements described herein according to the present invention.

Turning to FIG. 3, a schematic diagram of a coal tracking system according to the concepts of the present invention is designated generally by the numeral 20. Although the present invention is directed to the tracking of coal through a coal-fired power plant, skilled artisans will appreciate that the concepts disclosed can vary in arrangement and are applicable to any situation where several different qualities of a material are blended for a desired quality of the material. As coal is transported from a coalmine 22 to the power plant's receiving station 24, the coal vendor typically weighs and analyzes the physical properties of the coal, which is referred to herein as vendor material data 26, and relays this information to the purchaser (in this case, the coal-fired power plant). The weight of the coal is determined using scale 32A, and the properties of the coal are analyzed (including, but not limited to, the heat value, sulfur, ash, and moisture contents) using analyzer 33A. Other scales and analyzers will be considered in the context of this embodiment, but they will be referred to using distinct alphabetic designations, e.g. scale 32B or analyzer 33D, to designate distinct scales or analyzers. In FIG. 3, the capital letter A in a circle represents an analyzer, a capital letter S in a circle represents a scale, a capital letter V in a circle represents a variable belt drive, and a capital letter R in a circle represents an RFID reader. In this application, the RFIDs have no internal data other than a unique identification (like ID number). Hence, only the ID is read and the properties of the fuel quantity associated with that RFID is the historical data assigned and stored in a controller. The fuel data in the controller associated with that RFID tag can be revised should there be another occasion for analysis or maybe a controlled blending operation. This preliminary material data 26 is manually or electronically entered into a controller 40. The controller 40 may be a logic control using a general purpose, or application specific semiconductor based microprocessor/microcontroller that provides the necessary software, hardware and memory storage devices for controlling the operation of the overall system and for implementing the various advantages of the present invention. The controller 40 may also consider data inputs including, but not limited to, fuel availability, fuel characteristics, electrical output load projection, plant/boiler capabilities, emission constraints and power generation economics to provide informational and advisory outputs to a user. As will be discussed in further detail, the controller 40 incorporates operation of an algorithm that accurately predicts and continually updates the flow of coal through the system and, in particular, through a silo/hopper component of the system.

Once the coal arrives at the plant receiving station 24, it is weighed and analyzed using scale 32B and fuel analyzer 33B. The scale 32B and analyzer 33B generate as-received material data 34, which includes the same and possibly additional data parameters, that can be checked against the vendor material data 26. This may be done for quality control purposes and to allow verification of fuel contract terms. This as-received material data 34 is entered into the controller 40. RFID tags 16 are prepared for mixing with the coal, with each RFID tag 16 having its own unique identification number. A record for all RFID tags 16 is maintained in the controller 40, with each individual RFID tag record being associated with certain other information such as as-received material data 34. Association of the as-received material data 34 with an RFID tag 16 is accomplished by use of an RFID reader 36A and an RFID tag seeding mechanism 37 which effectively associates the as-received data of the coal or bulk material recently tested with the RFID tag 16. Once the as-received material data 34 is associated with the RFID tags 16 in the controller 40, the RFID tags 16 are proportionally placed, or seeded, into the supply of coal using the RFID tag seeding mechanism 37.

The RFID tag seeding mechanism 37 seeds RFID tags 16 in the supply of coal at a predetermined concentration. The RFID tag seeding concentration might be chosen from approximately one RFID tag 16 per half ton of coal for smaller batches such as truck deliveries or performance fuels, or one RFID tag per 50 or 100 tons of coal for bulk shipments from a single source such as unit train or barge deliveries. The number of RFID tags 16 placed into the supply of coal per unit of coal is selected to enable the coal-tracking or material property tracking objectives of this invention. Thus, the power plant operator may select a concentration of RFID tags that is sufficient to allow reliable and accurate gathering of information from coal that has been seeded with RFID tags, yet does not incur unnecessary costs for an excessive number of RFID tags. The RFID tags 16 may be read by a RFID tag reader 36 and the recorded ("logged") information associated with each RFID tag 16 may be retrieved at any time.

Once seeded with RFID tags 16, the coal is transported to the storage area 10 and is deposited in the storage area 10 based on relevant resource characterization criteria. The criteria often used to separate piles of coal relate to such factors as coal source or vendor, combustion characteristics, heat content, emissions, economic value, and the like. One skilled in the art would appreciate, however, that separation and storage of coal may be based on whatever criteria are relevant to plant operators, including, for example, convenience. In the exemplary schematic, coal has been segregated into three distinct piles or sections, designated by 11, 12 and 13 for Fuel A, Fuel B, and Fuel C, respectively. Of course, any number of sections could be employed. As noted previously, fuel A may be "performance" coal, fuel B may be "mid-range" coal, and fuel C may be "high value" coal.

A plant operator selects a mixture of coal to be burned in the furnace based on output load requirements, the available coal and its properties, emissions, economics, and other factors. By selecting a particular mixture of fuel having optimal blended characteristics, an economic advantage may be gained. Thus, the plant operator might select different proportions of Fuel A from pile 11, Fuel B from pile 12, and Fuel C from pile 13 to be mixed together at a blending station 50. Coal is transported from the various piles 11, 12, and 13 using a variable belt drive system 52A or any type of automatic or manual reclaim and conveyance system. As the coal is transported from the various sections 11, 12, and 13, it is weighed by scales 32C that generate weight data 51 that is entered into the controller 40. At blending station 50, the coal from the various sections 11, 12, and 13 is blended to provide a mixture of coal whose constituent elements (Fuel A, Fuel B, and Fuel C) are fully commingled with each other.

The fuel mixture thus blended is weighed and analyzed using scales 32D and analyzers 33D, generating blended data 53, as it is transported to a silo 60. It will be appreciated that any number of silos configured as shown could be employed. This post-mixture weight and analysis information, or blended data 53, is sent to the controller 40 and the record for each RFID tag 16 located within the blended mixture of coal is then associated with blended data 53. The blended mixture of coal is transported to and placed in the top of silo 60. The silo 60 may also be referred to as a bunker, hopper or any type of container which receives bulk material at an open top end or "upper free surface." The receiving container may be filled periodically or continuously with the bulk material. The material is drained from the container by gravity at a lower end which likely has a valve-like configuration to control the rate of drainage. The valve-like configuration may be in the form of a variable belt drive 52B. An exemplary silo at a coal-fired power plant is columnar in shape, taller than it is wide, and conical near the bottom, with a gravimetrically controlled feeder mechanism at the bottom. RFID tag readers 36 record the passage of each RFID tag 16 as they enter the top of silo 60, generating entry data 62 that is sent to the controller 40.

As the coal flows through the silo 60, the RFID tags 16 flow along with the coal. The coal and RFID tags 16 ultimately exit through a gravimetric feeder 61 at the bottom of the silo 60. An RFID tag reader 36C records the passage of RFID tags 16 as they pass through the gravimetric feeder 61 and generates exit data 63 that is sent to the controller 40. The exit data 63 is available to verify coal quality to the operator or, if necessary, to adjust operating parameters, such as the fuel mixture blended in blending station 50, to change the anticipated or future projected characteristics of fuel exiting silo 60. It will be appreciated that a reader 36C may be associated with each exit opening of the silo 60.

The blended coal mixture flows through the storage silo 60 based on a complex relationship influenced by such factors as the coal particle size, surface moisture of the fuel, the top surface profile and geometry of the silo, and the fill projections of the silo. Based on such factors, the controller 40 utilizes a flow model algorithm, based on the "Spot Model" theory, to predict the time-dependent quality of the coal mixture as it flows through the silo 60. The predicted flow model is specific to each container or silo, inasmuch as each silo has its own flow characteristics. As the fuel upper surface profile is a critical parameter in the flow projections, continuous updating of the surface contour can be done with the reader 36B which is configured to monitor the placement of the tags 16 on the upper free surface, and wherein the position on the surface can be correlated with each silo exit. The reader 36B may also be configured with a camera or similar device to determine the contour of the upper free surface and the position of specific tags 16 as they are deposited into silo 61. An array of ultrasonic or laser devices may also be used to correlate position of the tags 16 on the upper free surface. This surface profile capability is particularly valuable during silo fill operations where the fill chute might be multi-positioned or the fill rate irregular.

Figure 4A:
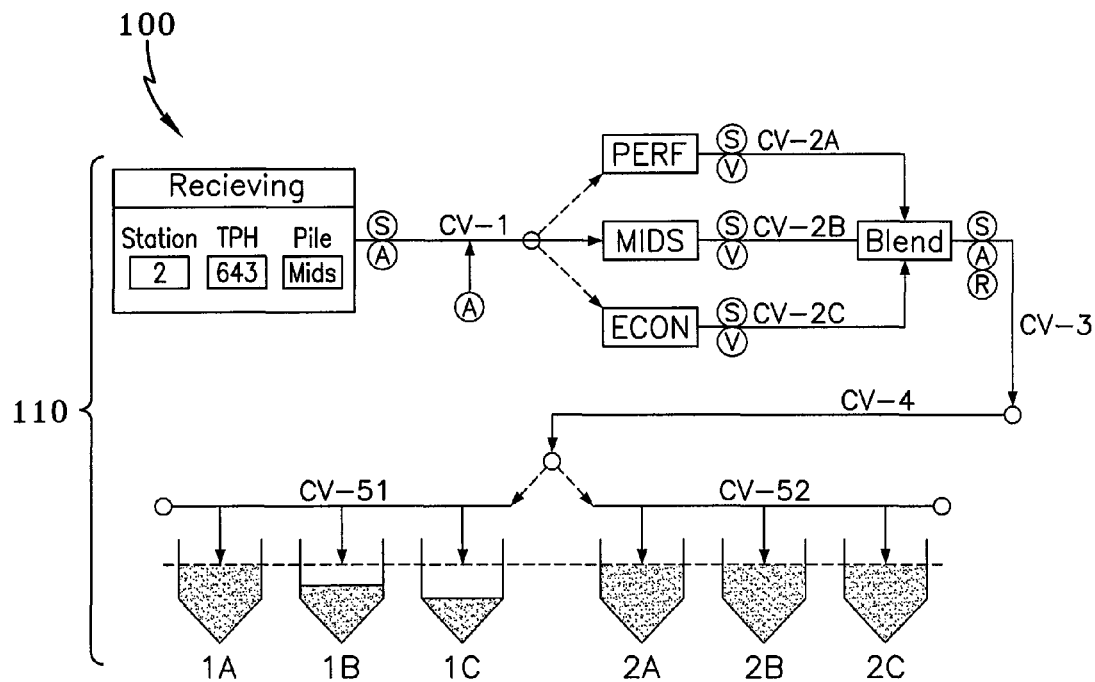
FIGS. 4A and 4B comprise an exemplary user interface screen to allow monitoring and control of coal flow within the power plant.
Figure 4B:
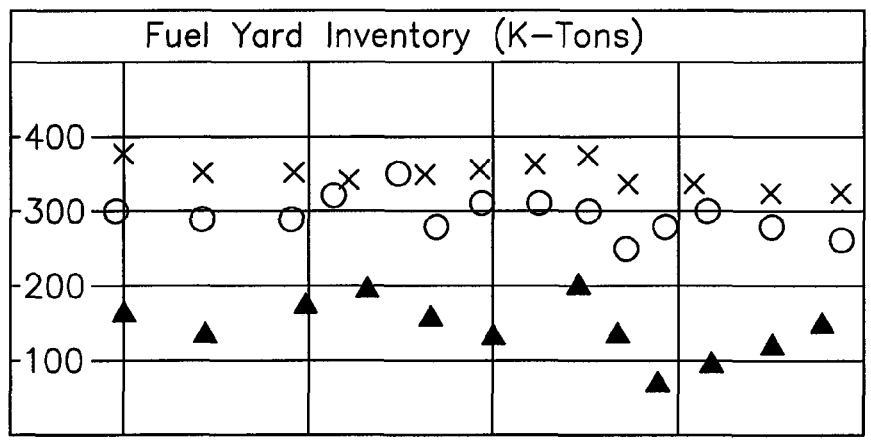

FIGS. 4A-4B present a simplified schematic and data summary display that might be used by the plant operator as an advisory and control tool. As will be discussed in further detail, this display presents real-time data to evaluate the present operations as to fuel status, generation capabilities/limitations, combustion/emission characteristics and economics. In addition, projections of fuel use and control of these characteristics over the near-term is enabled by the controlled blending of the available fuels and silo loading to optimally meet forecast operating conditions.

The Spot Model theory provides a robust conceptual framework for describing flows in random packing situations where "spots" of fluidization drive correlated motion of nearby particles. The shape of the spot and its motion reflects correlations in the material caused by volume constraints and inter-particle forces. Each random displacement of a spot is a stochastic event, and so the predicted flow model used in the present invention may also be regarded as a stochastic flow model. In the present embodiment the "spot" refers to a particle, such as a piece of coal, as it flows through a silo or container.

Figure 5A:
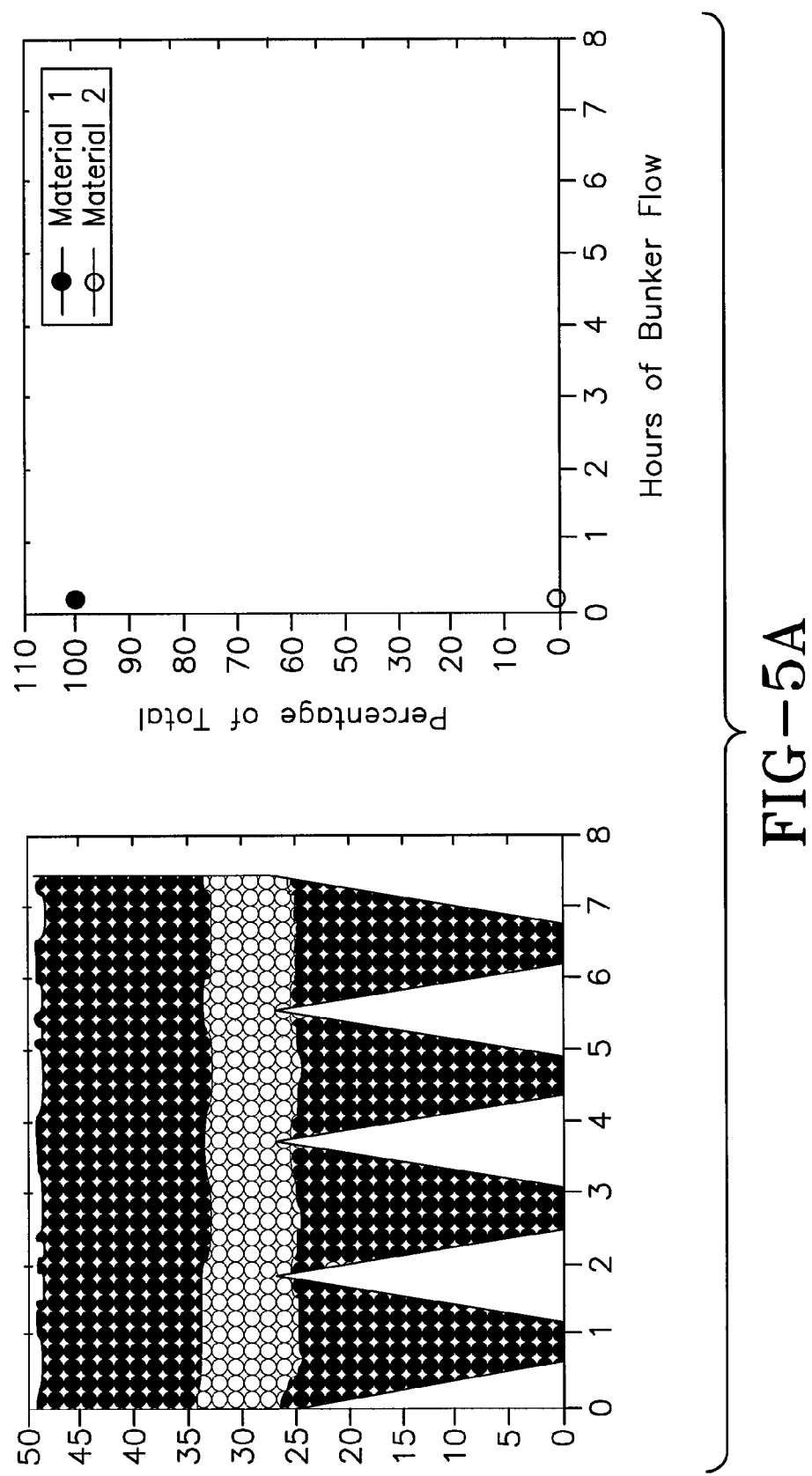
Figure 5B:
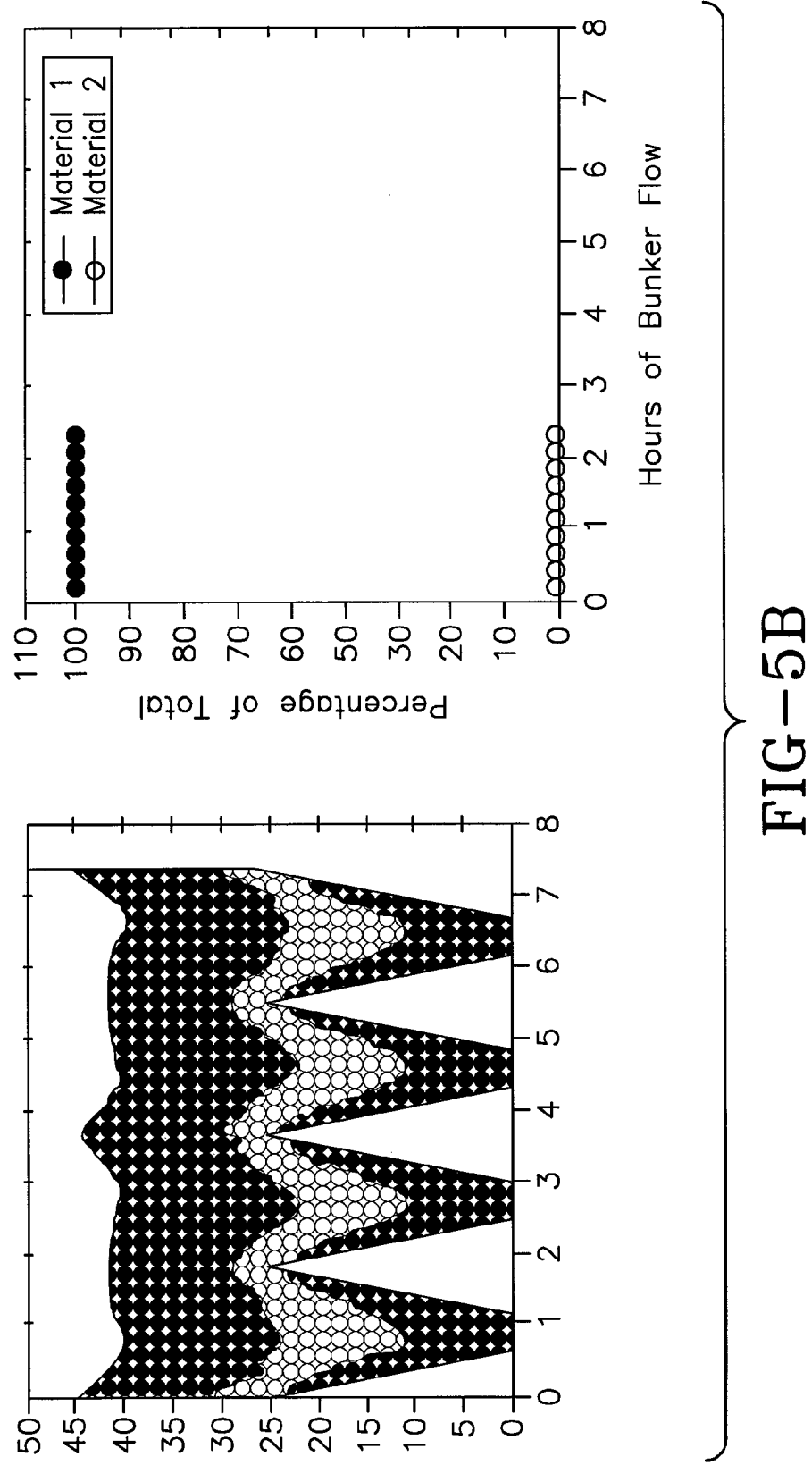

Some general advantages of the stochastic flow model used in connection with the present invention are illustrated in FIGS. 5A-C. A sample tag-calibrated coal bunker simulation shows how a layer of highlighted material, which may have somewhat different properties than the other material loaded in the bunker, progresses through the bunker upon gravity-driven discharge. FIG. 5A shows an initial state, FIG. 5B shows the flow at 2.5 hours, and FIG. 5C shows the flow at 7.5 hours. Although the bunker geometry, with smooth walls and a narrow funnel, was designed specifically to promote mass flow with FIFO behavior, the central region above the orifice flows faster and causes material that started at a higher level, or was filled at a later time, to exit the bunker before the material that started at a lower level, or was filled at an earlier time—thus strongly violating the FIFO assumption. Furthermore, the stretching and shearing of layers in the funnel leads to significant mixing which further leads to violation of FIFO. In this example, as seen in the figure, the second material flowed at 80% volume fraction for a total duration of 2 hours before it dropped down to 20%. Similarly during this time the material flowing at 100% dropped down to 20% and then jumped back up to 80%. It is also noteworthy that whenever the percentages changed they remained almost steady for several hours and therefore could significantly affect any use of the discharged material, which is sensitive to the compositional changes (such as coal at coal-fired power plant in the embodiment described above). This behavior predicted by the model is also borne out in experiments in the actual bunker, as described below.

Figure 6B:
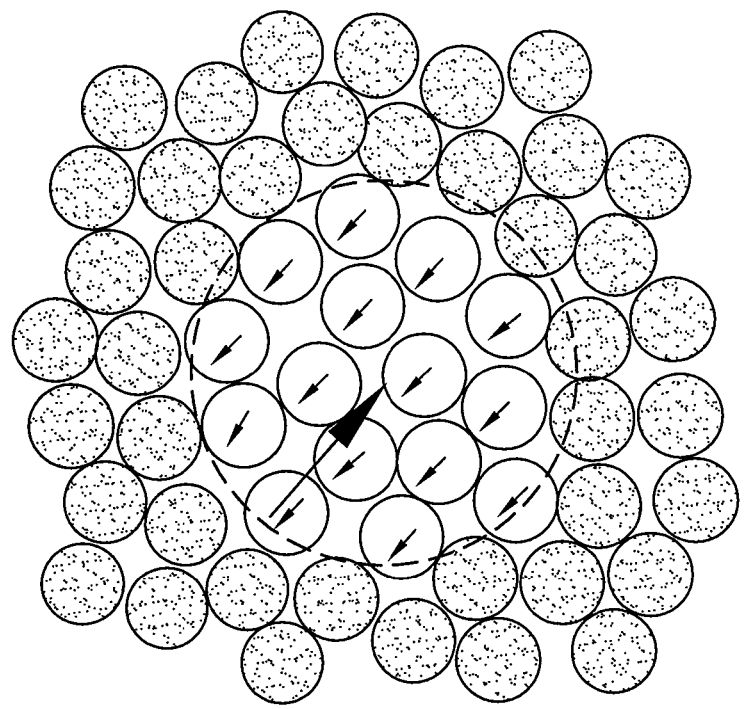
Figure 6C:
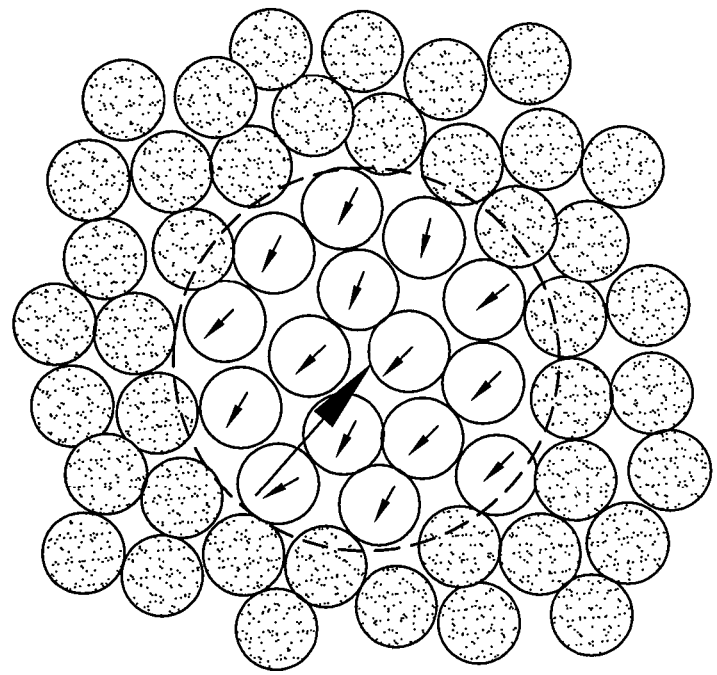

In order to accomplish such a simulation with calibration for accuracy in real time, the inventive tracking system employs fast stochastic event-driven computational algorithms, based on the Spot Model for random packing dynamics. The basic concept is shown in FIGS. 6A-6C. The bulk material is modeled by a set of passive particles of arbitrary shape and size (or simply mono-disperse spheres or disks), whose initial positions can come from another simulation, initialization on computational lattice, or from a model of the filling process for the container. As shown in FIG. 6A, particles move without positional constraints (e.g. off lattice) in response to extended "spots" of fluidization carrying a slight excess of free volume, which are released from the orifice upon drainage of an appropriate set of particles and perform random walks biased upward by gravity, interaction with the container walls in various ways, until reaching the free surface, where they are either removed or biased along the surface to mimic heap flow. Each random displacement of a spot is a stochastic event that drives correlated motion of all particles in the opposite direction (to conserve volume) within a chunk of the material falling within range of the spot. The shape of the spot and its motion reflect correlations in the material caused by volume constraints and inter-particle forces. As shown in FIGS. 6B and 6C, in simple versions of the model this motion can be correlated up to a certain cutoff distance or other smooth influence functions, such as Gaussian functions, can be used. These models give a good description of tracer particle dynamics and the composition of the discharge versus time, in a way that is easily adapted to any geometry and material with only a few adjustable parameters.

Figure 7:
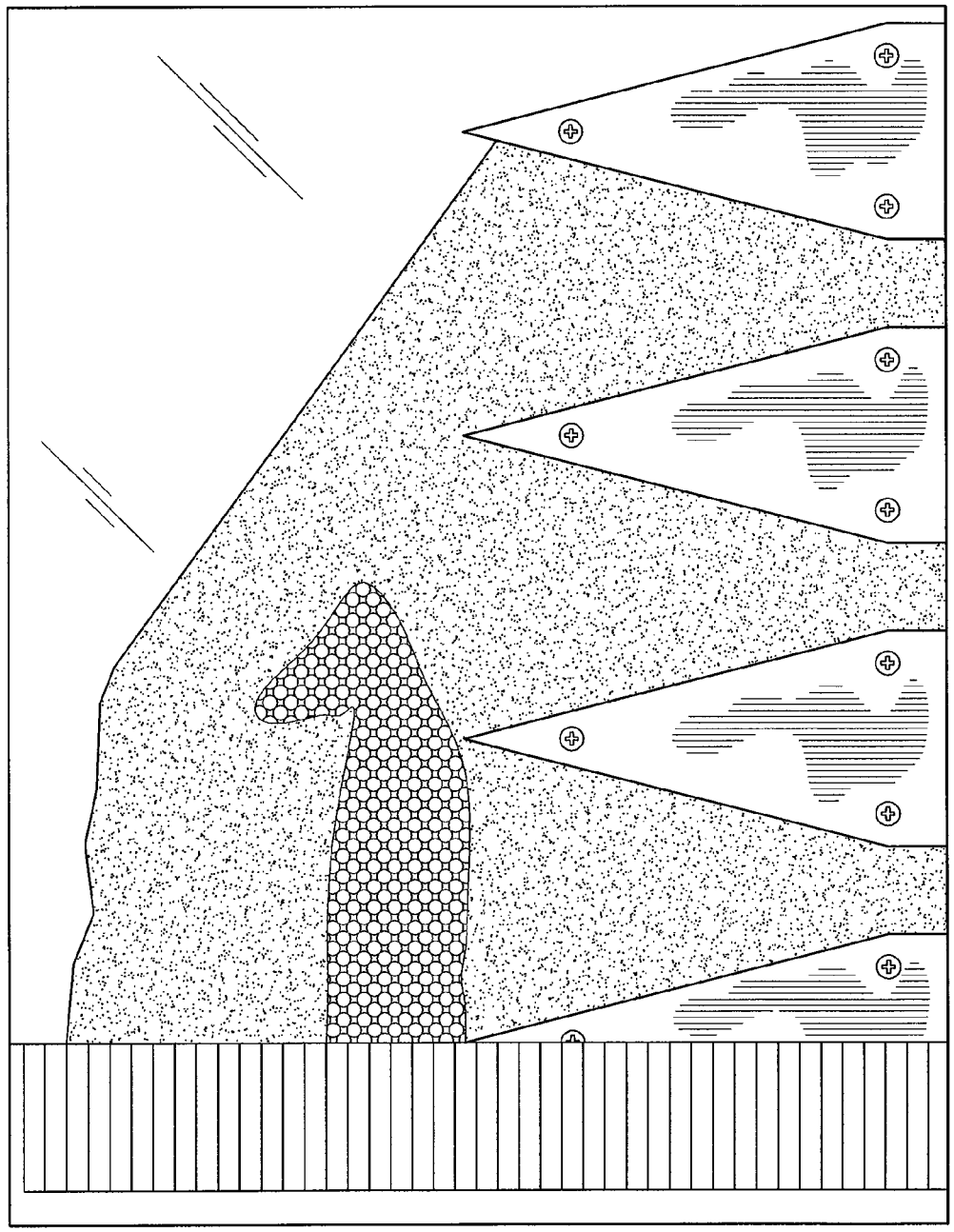
FIG. 7 is a schematic representation of a two-dimensional experimental apparatus used to validate the simulation method in a scaled-down model of a coal bunker with two different types of bulk material.

As part of the tracking-system development, experiments were performed to validate the computational models for a variety of bunker profiles and compositions. For example, as shown in FIG. 7, a quasi-two-dimensional ⅟₅₄ scale version of an existing coal storage bunker was constructed and experiments performed with a material (cat litter) resembling coal in its physical properties. A layer of a different material (plant food) was inserted in the filling process. A high-speed camera movie captured the material flow at rate of 30 frames per second, and the results were analyzed in comparison to the simplest and fastest version of the spot model, in two dimensions starting from a lattice without relaxation. The parameters in the model (spot diffusion length, spot radius, and spot volume) were independently fit to an experiment with only one material in a wide silo. For visualization of the simulation results, the particle distributions were averaged onto a lattice.

Figure 8B:
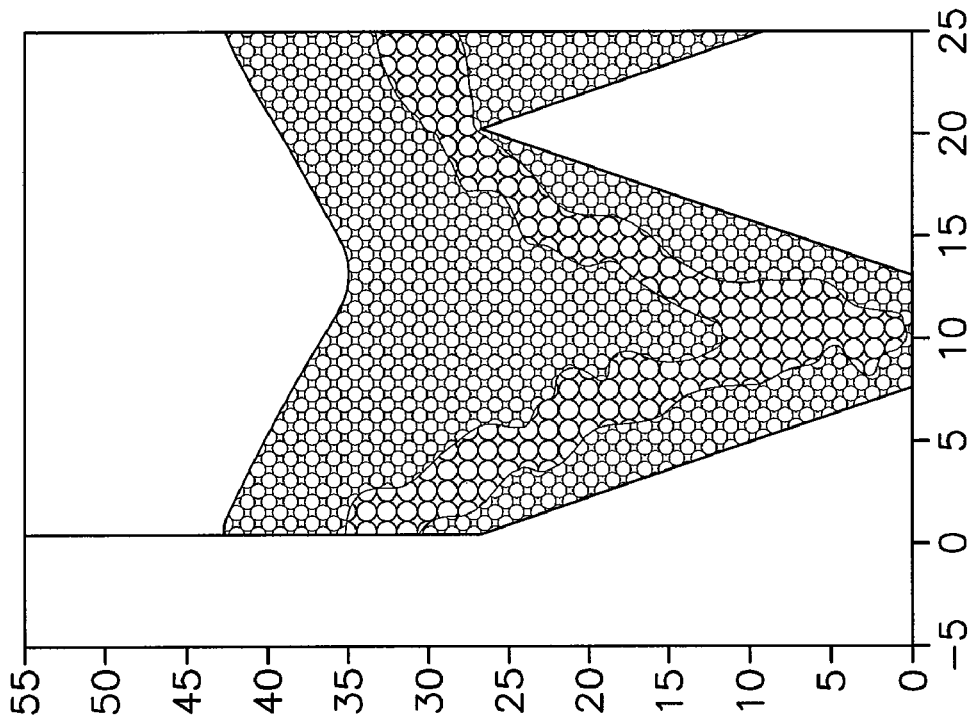
FIGS. 8A and 8B are schematic representations of a fast two-dimensional simulation of the dynamics of the two materials during discharge of the bunker.
Figure 8A:
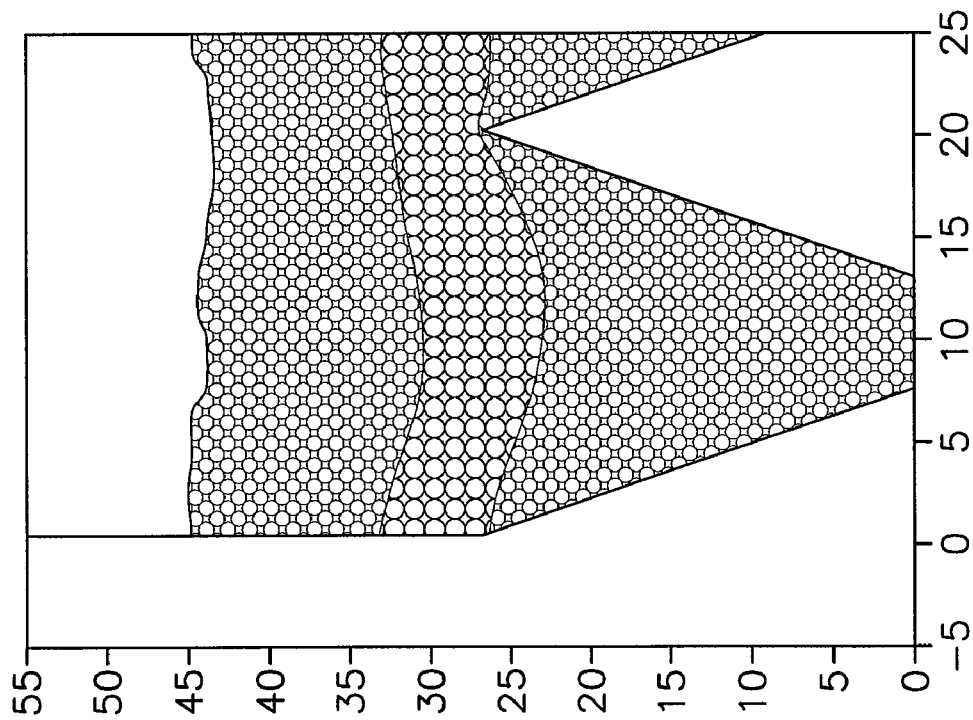

The simulation is shown in FIGS. 8A and 8B and illustrates good predictive capability. In FIGS. 8A and 8B computer simulation screens are shown of a quasi-two-dimensional silo, with an opening at the bottom. The simulation screens represent the predicted flow over time for a silo having two distinct varieties of fuel, with a band of designated fuel extending essentially horizontally across a different designated fuel at the initial time step in FIG. 8A. At a second time step in FIG. 8B, the simulation screen shows the predicted flow of the different fuels, with the portion of the one fuel above the opening moving faster through the silo than other portions of the both fuels disposed on the sides. The simulations were found to closely model experimental material flows. The stochastic model, therefore, can assist a plant operator in predicting the time-dependent composition of fuel that exits the opening at the bottom of a silo given information about the fuel that is placed in the silo. It is known that spot model generally predicts that the statistical profile of different materials in the flow depends on the total volume of material discharged, but not on the flow rate. This flow rate independence feature of the simulation algorithm was validated by the experiments at different flow rates.

The next component of the general tracking system consists of the identifiable tags 16, which are used to validate and calibrate the simulation, in separate experiments and in real time during bunker operation. In one embodiment, the tags are RFID markers, as previously discussed, with antennae and that are detected by readers. As shown in FIGS. 9 and 9A, the readers are positioned in feeder sections below the hopper orifices, where the material thins out, allowing reliable reading of each RFID marker, soon after it exits the bunker.

Figure 10:
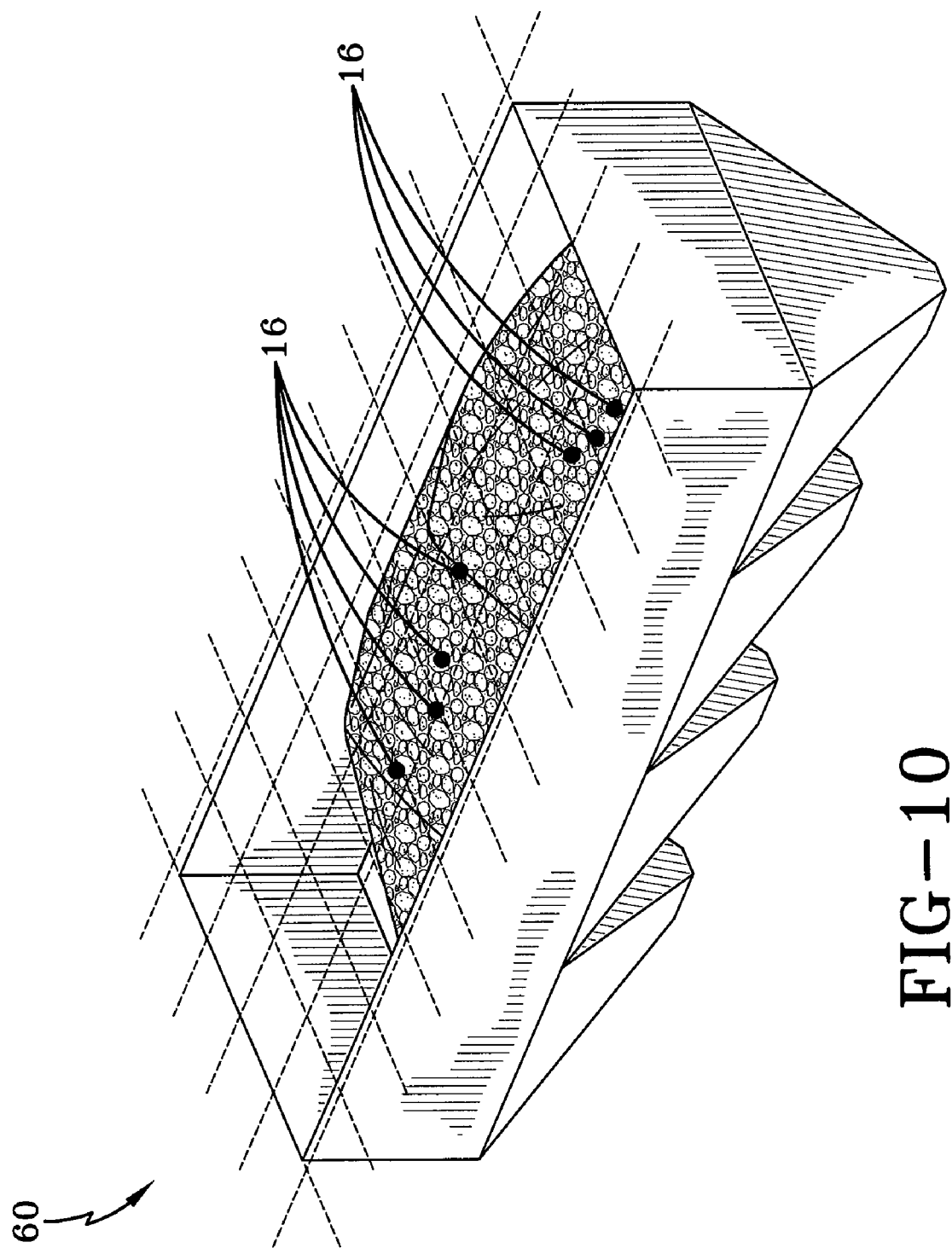
FIG. 10 depicts a coal bunker with three-dimensional coordinate points on the upper surface of the material to indicate where RFID markers are placed in a sample calibration step of the tracking system.
Figure 11:
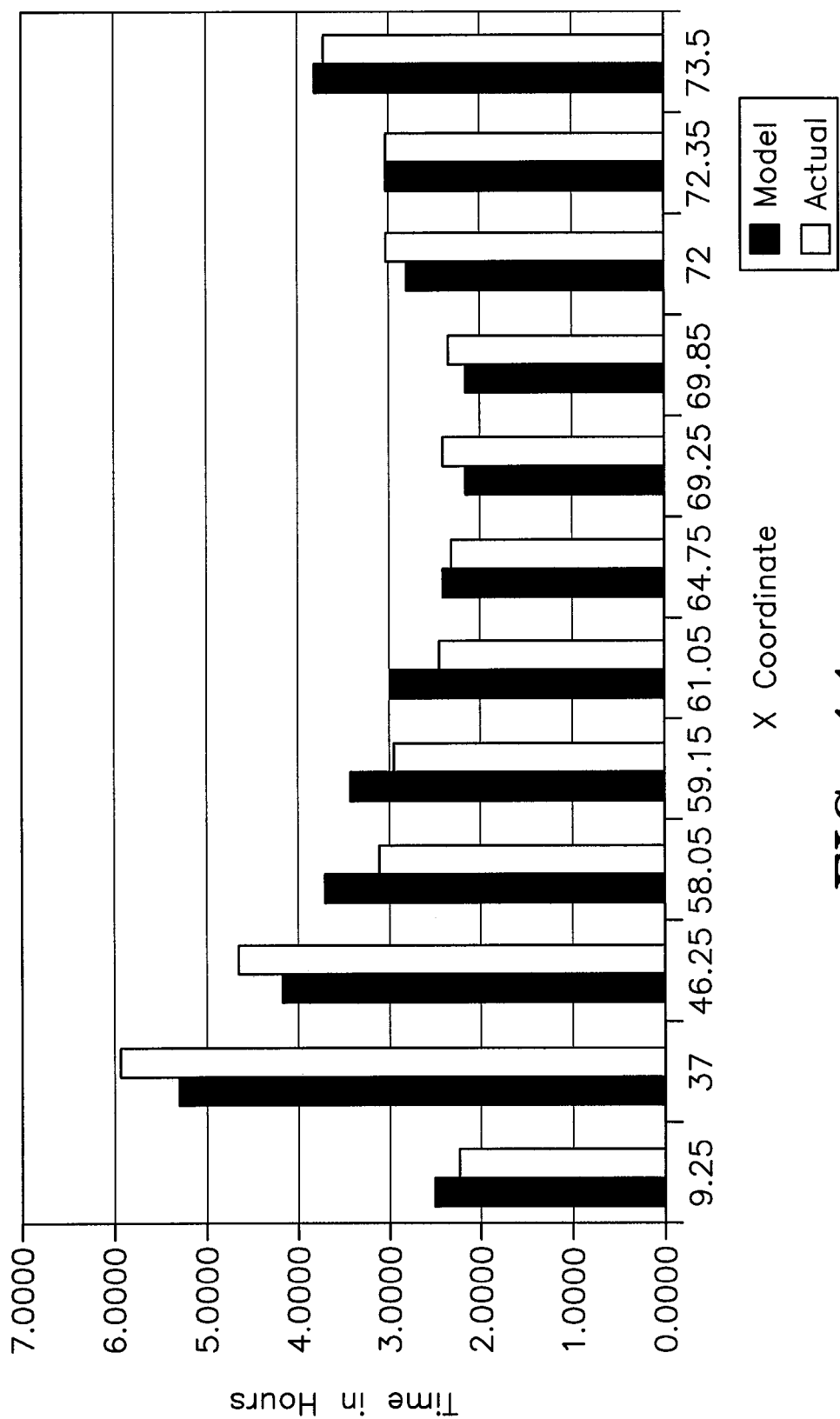
FIG. 11 displays the results of a test of material flow by giving the comparative exit times from the bunker from each RFID drop point, obtained by actual RFID detection at the exit versus the model predicted times.
Figure 12A:
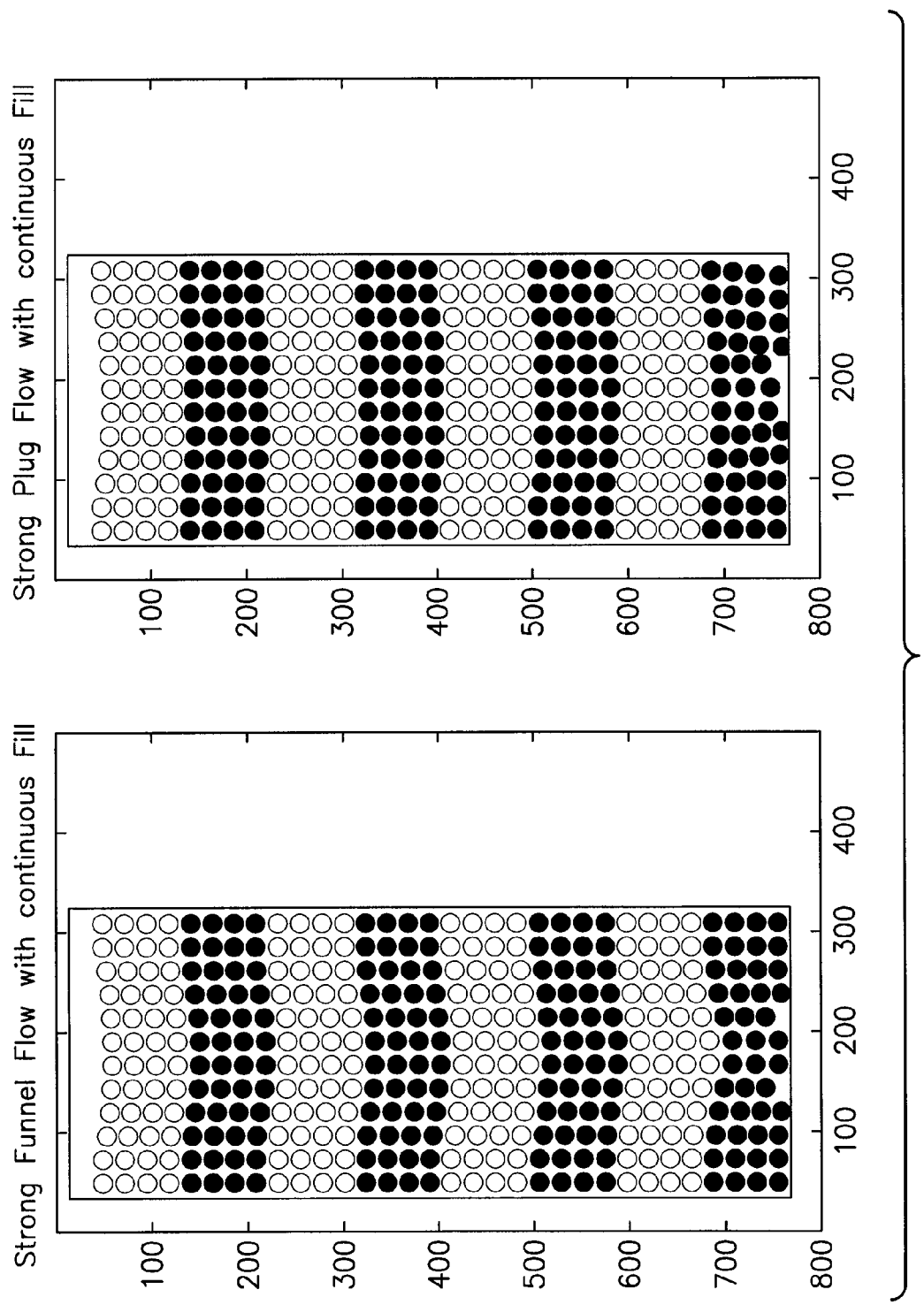
FIGS. 12A-12C show a time-sequence (top to bottom) of a slice from the center of three-dimensional multiscale simulations of a silo with a small orifice, illustrating the ability of the model to capture a transition from funnel flow to plug flow, wherein the simulation on the left uses a shorter spot diffusion length than that on the right.
Figure 12B:
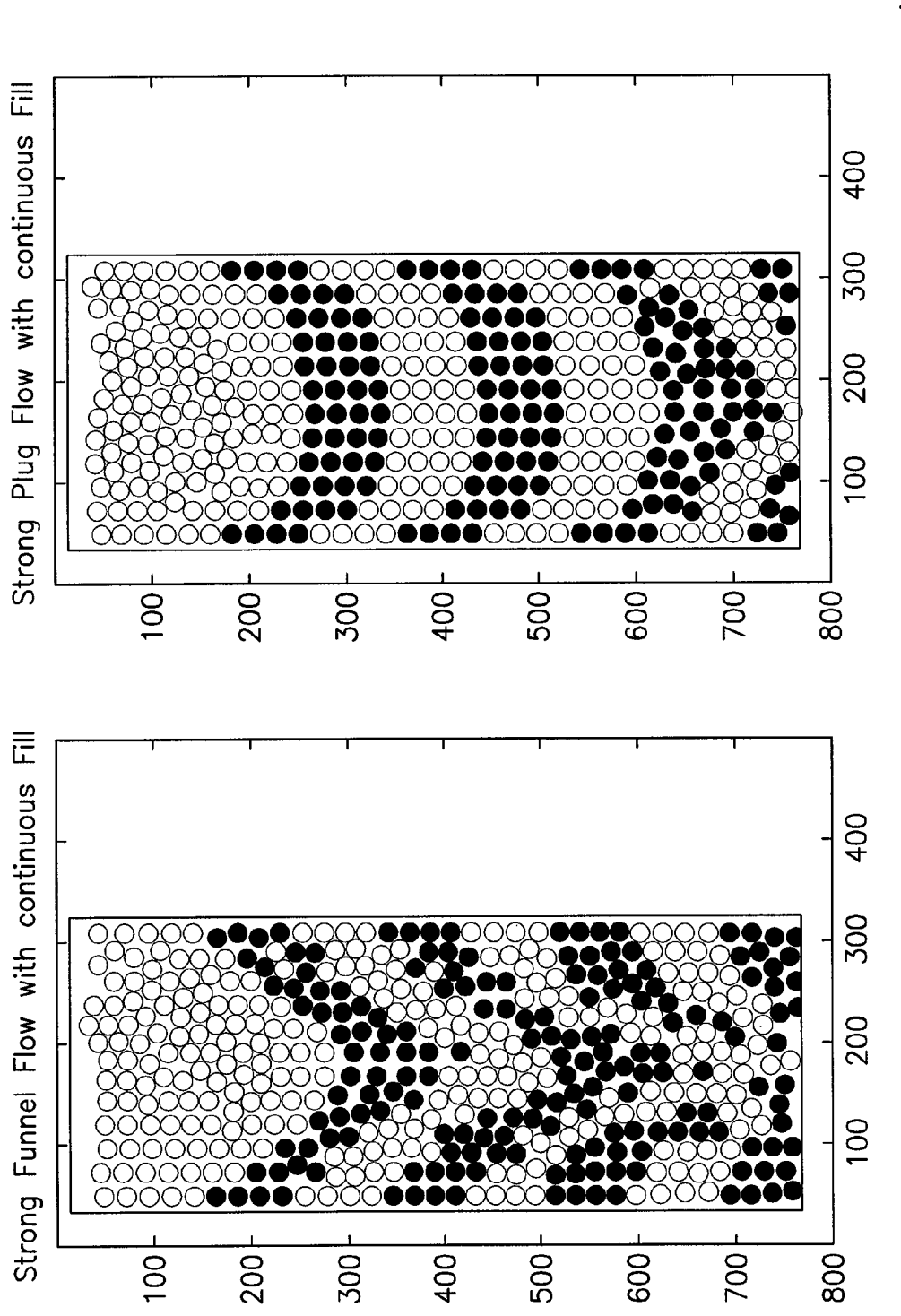
Figure 12C:
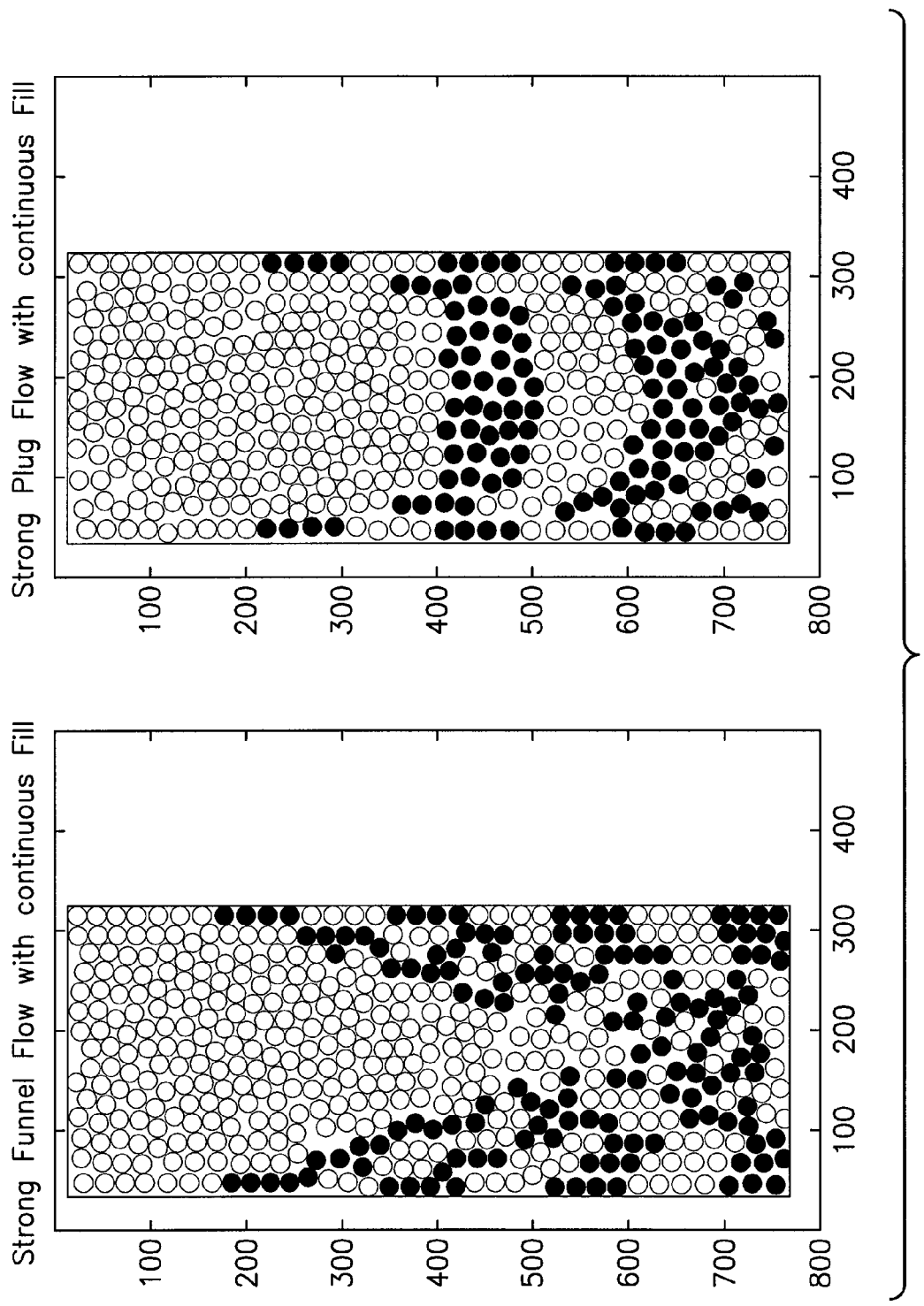

As shown in FIG. 10, the upper region of bunker may be conceptually divided into a grid, where physical properties of interest can be identified during filling. These locations are associated with the RFID tags as their initial positions, and then used to track the nearby material as it flows through the container. FIG. 10 illustrates initial positions of RFID tags which are correlated with the grid in a particular test run of an actual coal bunker. The results are shown in FIG. 11, which gives the comparative experimental and computed times that RFID tags dropped in particular locations took to exit the bunker. In this case, the RFID tags were mainly dropped along the centerline of symmetry above the orifices, so it is reasonable to use a fast two-dimensional version of the spot model for the simulation and ignore dispersion and mixing in the third dimension. The model parameters are adjusted to match the drop times of the RFID tags. The effective particle size in the discrete simulation reflects a typical scale for control volumes of material to be tracked, based on the upper grid scale and physical properties of the material. The spot is size somewhat larger than the particle size, but can be extended to model longer-range dynamical correlations, e.g. due to effects of cohesion. The primary fitting parameter is the spot diffusion length, which controls dispersion and mixing. The total spot influence (or free volume it carries) is set by the particle diffusion length, which is much smaller than the spot diffusion length, typically by a factor of 100, due to strong correlations between neighboring particle captured by the model. As shown in FIG. 11, the agreement between the predicted and actual mean exit times of the RFID tags is good, in spite of the simplicity and small number of parameters in the model, which enables fast real-time calibration and prediction during normal operation. The out-of-plane dispersion and mixing can likewise be captured by a three-dimensional version of same model, which can still be computationally efficient enough for real-time calibration and prediction.

The simple and fast spot algorithm just described produces accurate statistics of exit times, due to a good approximation of dispersion and mixing in the container, but it does not enforce volume constraints, which prevent particle overlap and void creation in real flows. As a result, it does not produce realistic dense flowing packings, which in some cases maybe needed for visualization and more accurate modeling of the flow. However, it is possible to generate very realistic flowing random packings in a "multiscale" version of the model. After each basic spot-induced particle motion, a relaxation step can be included, where all affected particles experience brief, simplified inter-particle displacements, e.g. due to a soft-core repulsion. The net correlated particle motion, which is shown in FIG. 6C, can be included in the algorithm and valid flowing packings can be achieved with minimal computational effort and without introducing any new parameters in the model.

By relaxing only once every 100 or 1000 times that a spot moves, the multiscale algorithm incurs negligible extra computational cost, and the simulation can run over 1000 times faster than discrete-element simulations. In particular, a complete silo discharge of many thousands of particles in three dimensions can be simulated in a relatively short time on a personal computer, thus allowing real-time calibration, prediction, and control. The simplest model with disks in two dimensions and no relaxation step is much faster and can run in several orders of magnitude less time, while still in many cases providing satisfactory results for the inventive tracking system. There is no need to generate finite-element grids or solve any continuum equations numerically, and the model has only a few parameters, which can be easily fit in the calibration process in real time in the inventive tracking system.

By adjusting the spot diffusion length or the geometry, the model is able to replicate observed transitions from funnel flow to plug flow. As shown in FIG. 13 for simulations of a quasi-2d silo with a narrow orifice, using a three-dimensional multiscale spot algorithm with smaller spot diffusion length (left) models funnel flow, while simply adjusting the diffusion length yields a transition to plug flow (right). Shear boundary layers, which depend on friction with the walls, can also be described by adjusting the interaction of spots with the walls, e.g. depending on the point of closest approach.

By adjusting the spot diffusion length or the geometry, the model is able to capture observed transitions from funnel flow to plug flow. Shear boundary layers, which depend on friction with the walls, can also be described by adjusting the interaction of spots with the walls, e.g. depending on the point of closest approach.

The spot algorithm used describes dense bulk flow of a random packing, but it does not predict the dynamics at the orifice or at the free surface. The orifice dynamics can be modeled by simply prescribing the injection of spots into the material to match the observed flow rate of exiting material. This can be done in real time using the RFID measurements. In the algorithm, the free surface dynamics, including avalanching and heap flow, can be roughly modeled by biasing spots toward particles in the heap (rather than leaving the packing). In practice, if measurements can be made of the surface height or its profile, e.g. by ultrasonic or laser detectors, then new material can be added in such a way that exactly matches the observed free surface profile, filling in exposed regions of drainage from the passage of spots through the packing. This method can also be applied to describe the formation of short-term or "working" piles below stacker belts. Such piles are typically characterized by dwell or turnover times of the bulk material inventory is on the order of hours to several days. These piles usually have a fixed position overhead stacker and directly below a subsurface reclaim hopper for the bulk material. The spot algorithm is applicable to this bulk material flow with the calibration process using the RFID tags as previously described. The controller 40 incorporates the above discussed algorithms and based on real detected events and desired "what if" scenarios input by the operator 70, an accurate real-time determination can be made as to the flow of material through the entire tracking system 20.

Returning back to FIG. 3, the controller 40 sends advisory information 69 to a plant operator 70, who then may direct the flow of coal between the silo 60 and a grinding apparatus 80 by generation of a drive signal 71 to a variable belt drive 52B. In some embodiments, the variable belt drive 52B may be a series of control valves or feeders that are selectively operated by the controller 40 and plant operator 70 to adjust the delivery rate of a desired mixture of material supplied to an end use. The coal mixture is ground in grinding apparatus 80 to a consistency appropriate for combustion.

The ground coal is then transported with feed rate precision from the grinding apparatus 80 to a furnace/boiler system 90 where it is combusted to release thermal energy. Through the signals 71 and 72, the operator has precise information regarding the rate and blend of coal that is sent on to the furnace/boiler system 90. As load forecasts, boiler conditions and/or emissions indicate a need for an adjustment of the quality or blend of coal received at the furnace, the operator 70 and/or with the assistance of the data 69 generated by the controller 40, may generate a drive signal 92 received by the variable belt system 52A. This allows the operator to adjust the coal blend to comply with emissions and to optimize energy generation in the most effective manner possible. Generation of electricity from the combustion of coal is accomplished using methods well known in the art.

Turning now to FIGS. 4A and 4B, an exemplary user display or interface screen 100 is seen for use by the boiler operator, coal handling personnel and fuel purchasing/accounting group. From the multiple inputs and programming, the controller 40 generates and displays to a user many facts about the coal at the power plant, including: coal inventory information including weight, BTU data, cost and other information, momentary "on-the-belt" coal analysis, belt transfer rate information, and blending information. For instance, the interface screen 100 displays the "Fuel Yard Inventory" data for the three different categories of coal used at the plant, which corresponds to Fuels A, B, and C in sections 11, 12, and 13 of the coal storage area 10, as in FIG. 3. Referring to this "Current Yard Inventory," which is labeled as "Inventory Results", a user would know that there are 719,108 total tons of coal available on the premises and the respective types and tonnage information for each type. A graphical representation of the Current Yard Inventory may also be provided as shown, with this example showing a relatively long-term history (3 months). The interface screen 100 also displays other information, including integrated tonnage and rate data for coal being transferred along the "Belt Scales." The Belt Scales data informs the user about coal flow rates along specific belts or points, corresponding to belt systems 52 shown in FIG. 3. For instance, the user would know that Scale CV-3 (corresponding to, for example, belt drive system from blending station 50 in FIG. 3) is momentarily transferring coal at a rate of 382 tons per hour (TPH). The interface screen 100 also provides on-the-belt coal specifications wherein the left-most column lists various properties of the coal and the other columns correspond to the analyzer(s) 33 and/or other analysis documentation for the (calculated) resultant blend. Such a display allows the operator to verify the current blending and, if desired, make appropriate adjustments. The interface screen can also be configured to highlight those variables when they range toward unacceptable levels. For example, if the sulfur dioxide ($SO_2$) emission rate reaches a specified level, an appropriate indication would be generated and corrective action might be taken to adjust blending ratios of available fuels so as to stay within the desired sulfur dioxide emission rate. The interface screen also displays the Blending Results that show the effective tons per hour and blend ratios as the coal proceeds through the overall system 20. In a similar manner, silo destinations and tripper locations can be monitored as needed. The interface screen 100 also provides for a system schematic 110 showing the various analyzers, scales and readers in a schematic form so that the user can visualize the operational status of various components within the system. While specific examples of information have been discussed and are shown with regard to exemplary interface screen 100, one of skill in the art would appreciate that the interface screen 100 could be modified to display to the user other available information deemed relevant.

The invention disclosed in the present embodiment has several advantages over the state-of-the-art. A first advantage of the present invention is that it allows a coal-fired power plant to track its coal inventory in real-time, including the amounts, characteristics, locations, and book value of selected classifications of coal within the confines of the power plant. A second advantage of the present invention is that it provides a coal plant operator with real-time advisory information related to the selection of fuels to be burned based on their operational and economic properties as they relate to load projection, fuel availability, load characteristics, plant/boiler capabilities, emission regulations and electrical generation economics. A third advantage of the present invention is that it generates and preserves an information record of coal-related events. A fourth advantage of the present invention is that it predicts present and near-term fuel usage and associated combustion properties using a predicted silo flow model that is validated based on past silo loading history and predicted generation demand. Further advantages of the present invention will be understood and appreciated by those of skill in the art.

It should be clear to one skilled in the art that the tracking system and methods described above are very general and can be applied to any type of bulk material handling. For example, at an ethanol production facility, large quantities of raw plant materials, such as corn, woodchips, sugarcane, or switchgrass, are transported from different harvesting locations, under different environmental conditions. As such, the raw materials have variable physical properties, such as carbon content, water content, entrained soil, etc. In order to optimize the production process, e.g. making ethanol of varying quality at different times or making the production rate more uniform, in some embodiments, the flow and mixing of the heterogeneous raw materials may be characterized, tracked, and controlled in silos and bunkers by the tracking system present invention, following the methods described above in the case of coal handling at coal-fired power plants.

In other embodiments, the present invention is used to characterize raw waste materials, such as glasses, paper, cardboard, plastic, etc. at a recycling facility. For example, in the case of glass recycling, the composition of different colors and types of glass shards and the content of remaining unwanted waste material is measured and recorded as the raw material is added to a bunker and the tracking system of the present invention is used to characterize and control the blend of glass waste entering the furnace.

In other embodiments, the present invention is used to track the handling of component materials, such as a metals, plastics, rocks, gravel, sand, cement, fibers, ceramics, etc. in chemical or materials processing.

From the foregoing description, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A tracking system for bulk materials comprising:
    at least one funnel-shape container that receives a bulk material that has different physical properties, wherein said bulk material forms an upper free surface in said funnel-shape container that can be subsequently covered upon receipt of additional bulk material and wherein the bulk material mixes while flowing through said funnel-shape container and drains therefrom at a container exit;
    a plurality of identifiable tags placed in the material;
    a recording system that detects physical properties of the bulk material, wherein said recording system associates said physical properties with at least one said identifiable tag;
    a first reader positioned to monitor locational placement of said plurality of identifiable tags on said upper free surface, said first reader generating initial location entry data;
    a second reader positioned proximal said container exit so as to read said identifiable tags passing therethrough, said second reader generating exit data; and
    a controller connected to said recording system to monitor said plurality of identifiable tags and associated physical properties of the bulk material, said controller receiving said initial location entry data and exit data and generating a mixing flow model based on said entry and exit data to determine the flow of the bulk material through said funnel-shape container, wherein said controller uses said mixing flow model to predict the composition and different physical properties as the bulk material flows from said container exit.

2. The tracking system according to claim 1, further comprising:
    a variable belt drive system connected to said controller, said variable drive system controlling delivery of the bulk material with desired physical properties to said container by receiving advisory information from said controller so as to adjust delivery of bulk material to said at least one funnel-shape container.

3. The tracking system according to claim 2, wherein the bulk material is stored in different sections according to grade and is drawn by said variable belt drive system.

4. The tracking system according to claim 3, further comprising:
    a blending station connected to said controller and receiving the bulk material from said variable belt drive system, wherein said controller causes said blending station to blend the different grades of the bulk material prior to delivery to said at least one funnel-shape container.

5. The tracking system according to claim 4, wherein said controller adjusts operation of said variable belt drive system and said blending station in realtime to control the predicted composition of the bulk material leaving said at least one funnel-shape container at future times.

6. The tracking system of claim 1, wherein the bulk material comprises solid fossil fuels, such as coal.

7. The tracking system of claim 1, wherein the bulk material comprises raw materials for biofuel, such as corn, sugarcane, switchgrass, or woodchips.

8. The tracking system of claim 1, wherein said identifiable tags, which can be identified as they exit the container, are selected from the group consisting of radio-frequency identification (RFID) devices, and particles of distinct color, chemical/physical signature, or having a bar code.

9. The tracking system of claim 1, wherein the identifiable tags are radioactive particles, which can be located in the bulk material by external detectors.

10. The tracking system of claim 1, wherein said mixing flow model is an event-driven stochastic algorithm, such as the spot model.

11. A method of tracking bulk materials in at least one container drained by gravity, comprising:
    adding bulk material, which has different grades, to a funnel-shape container wherein the bulk material mixes while flowing through said funnel-shape container and drains from said funnel-shape container at a container exit;
    seeding the bulk material with identifiable tags, wherein said tags are associated with physical properties of the bulk material's grade;
    monitoring locational placement with a first reader of said identifiable tags in said funnel-shape container on an upper free surface of the bulk material added to said container;
    generating initial location entry data from said first reader;
    monitoring with a second reader said identifiable tags passing through said container exit;
    generating exit data from said second reader;
    generating a mixing flow model based on said initial location entry and exit data; and
    adjusting delivery of the different grades of bulk material to said funnel-shape container based on said mixing flow model.

12. The method according to claim 11, further comprising:
    predicting the flow and mixing of the bulk material through said funnel-shape container based on the monitored flow of the bulk material as determined by said entry data and said exit data.

13. The method according to claim 12, wherein the bulk material is coal.

14. The method according to claim 12, further comprising:
utilizing an event-driven stochastic algorithm with discrete particles to generate said mixing flow model and predict the flow of the bulk materials.

15. The method according to claim 12, further comprising:
selecting said identifiable tag from the group consisting of radio-frequency identification devices, particles of distinct color, a chemical signature, a physical signature, a bar code, and radioactive particles.

16. The method according to claim 12, further comprising:
receiving the bulk material;
analyzing and associating properties of the bulk material with said identifiable tags according to the bulk material's grade; and
storing the bulk material in designated areas according to the bulk material's grade.

17. The method according to claim 16, further comprising:
drawing the bulk material from the designated areas based on the predicted flow of material through the container and the desired property of the bulk material exiting said container.

18. The method according to claim 17, further comprising:
blending the bulk materials from the designated areas prior to entry of the bulk material into said container.

19. A method for tracking coal in a coal-fired power plant using radio frequency identification markers, comprising:
receiving coal at a receiving station;
designating physical properties of received coal as preliminary material data;
writing to identifiable tags from said preliminary material data, and sending tag information and said preliminary material data to a controller;
distributing said identifiable tags within the coal;
segregating the coal into sections according to said preliminary data;
blending the coal from at least one of said sections at a blending station;
designating revised physical properties of the blended coal as revised material data;
updating said identifiable tags in the blended coal with said revised material data;
sending updated tag information and revised material data to said controller;
generating a mixing flow model based on locational placement of said identifiable tags on an upper free surface of coal deposited in a funnel-shape container, the mixing of the coal flowing through said funnel-shape container and exit of said identifiable tags within the coal from said funnel-shape container and providing said mixing flow model to said controller;
delivering the blended coal to a furnace to generate a desired power output; and
generating signals by said controller based on said mixing flow model to control blending and delivering to obtain a desired mixture of the coal supplied to said furnace.

* * * * *